(12) United States Patent
Hooper et al.

(10) Patent No.: US 7,206,858 B2
(45) Date of Patent: Apr. 17, 2007

(54) DSL TRANSMIT TRAFFIC SHAPER STRUCTURE AND PROCEDURE

(75) Inventors: Donald F. Hooper, Shrewsbury, MA (US); Serge Kornfeld, Waltham, MA (US); Robert P. Ottavi, Brookline, NH (US); John C. Cole, Milford, NH (US)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 10/247,763

(22) Filed: Sep. 19, 2002

(65) Prior Publication Data

US 2004/0059828 A1 Mar. 25, 2004

(51) Int. Cl.
*G06F 15/173* (2006.01)
*G06F 15/16* (2006.01)

(52) U.S. Cl. ...................... 709/238; 709/250
(58) Field of Classification Search .............. 709/238, 709/250
See application file for complete search history.

(56) References Cited

U.S. PATENT DOCUMENTS

| | | | | |
|---|---|---|---|---|
| 5,649,110 A * | 7/1997 | Ben-Nun et al. | ............ | 370/351 |
| 6,032,218 A | 2/2000 | Lewin et al. | | |
| 6,047,002 A * | 4/2000 | Hartmann et al. | .......... | 370/466 |
| 6,272,109 B1 * | 8/2001 | Pei et al. | .................... | 370/230 |
| 6,424,657 B1 * | 7/2002 | Voit et al. | .................... | 370/412 |
| 6,457,015 B1 * | 9/2002 | Eastham | ..................... | 707/102 |
| 6,501,731 B1 * | 12/2002 | Chong et al. | ............ | 370/230.1 |
| 6,629,147 B1 * | 9/2003 | Grow | .......................... | 709/236 |
| 6,724,767 B1 * | 4/2004 | Chong et al. | ............... | 370/412 |
| 6,768,717 B1 * | 7/2004 | Reynolds et al. | ........ | 370/230.1 |
| 6,959,002 B2 * | 10/2005 | Wynne et al. | .............. | 370/412 |
| 2003/0161303 A1 * | 8/2003 | Mehrvar et al. | ............ | 370/386 |

FOREIGN PATENT DOCUMENTS

WO    WO 00/38376    6/2000

OTHER PUBLICATIONS

ALberto Leon-Garcia, "Communication Networks, Fundamental Concepts and Key Architectures", Copyright 2000, McGraw-Hill Higher Education.*
Giroux, N., et al., "Queuing and Scheduling: Quality of Service in ATM Networks, Chapter 5", *Quality of Service in ATM Networks: State-of-the-Art Traffic Management*, pp. 96-120 (1998).

* cited by examiner

*Primary Examiner*—David Wiley
*Assistant Examiner*—J. Bret Dennison
(74) *Attorney, Agent, or Firm*—Fish & Richardson P.C.

(57) ABSTRACT

A method and apparatus for transmitting network traffic includes selecting a major node in a major ring, where the major node corresponds to a first transmission opportunity encoded in the major ring. The major node specifies a minor node in a minor ring representing a virtual port. The method and apparatus also includes transmitting network traffic to a virtual connection that uses the virtual port. Alternatively, transmitting network traffic involves processing a schedule that includes a sequence of transmission opportunities encoded in a schedule ring and satisfying a minimum data rate for a scheduled virtual connection by processing a corresponding first minimum number of transmission opportunities from the schedule, each such transmission opportunity allocated by a schedule node to the scheduled virtual connection, where the schedule node is included in the schedule ring.

68 Claims, 15 Drawing Sheets

DSL TRANSMIT TRAFFIC SHAPER STRUCTURE AND PROCEDURE

TECHNICAL FIELD

This relates to networking, and more particularly to traffic management and controlling packet rates for transmission over many connections from a packet source or packet-forwarding device.

BACKGROUND

Digital Subscriber Link (DSL) service is a network communication protocol. DSL supports fixed bit rates at which packets may be sent over a network. In one common configuration, a customer contracts to receive DSL service from a service provider. On the service provider side, a DSL port connects to a DSL Access Multiplexer (DSLAM), which connects to a router. On the customer side, another DSL port interfaces to a modem that connects to customer premises equipment (CPE). An ATM network connects the service provider-side router and the CPE. Many ports may be aggregated in the network system and connected to the router with a single physical port interface.

For each port there may be many virtual connections. These represent stateful communication setups such as an ATM virtual circuit or Internet TCP connection. At each end of the virtual connection is a software application that can send and receive messages. The messages are carried across the network as packets or frames subdivided into 48-byte ATM cells. The interface in and out of the forwarding device is either 48-byte ATM cells or 64-byte frame segments. Each virtual connection has a quality of service or rate specification. The ATM Forum Traffic Management Specification version 4.1, AF-TM-0121.000, published March, 1999, specifies types of rates, including constant bit rate (CBR), variable bit rate (VBR), and unspecified bit rate (UBR). Variable bit rates can be contracted with a minimum cell rate (MCR), a sustained cell rate (SCR), a peak cell rate (PCR), or a combination of these. Additionally, some VBR virtual connections can be designated real-time (abbreviated as "rt-VBR"), which, among other things, can affect the virtual connections' tolerance of errors or delays in the communication channel. In particular, the tolerance of delay may affect how (or for how long) data for a real-time VBR virtual connection should be queued. Non-real time VBR is abbreviated "nrt-VBR". A UBR virtual connection can have a priority categorization relative to other UBR traffic. Ports can have peak data rates, describing the maximum rates at which they are capable of transmitting, typically in bits per second. Maximum burst size (MBS) is a parameter specific to a given network protocol and a given implementation. MBS describes the maximum number of cells that may be transmitted continuously from a port over a network link.

DETAILED DESCRIPTION

The details of one or more embodiments are set forth in the accompanying drawings and the description below. Other features, objects, and advantages will be apparent from the description and drawings, and from the claims.

Figure 1:
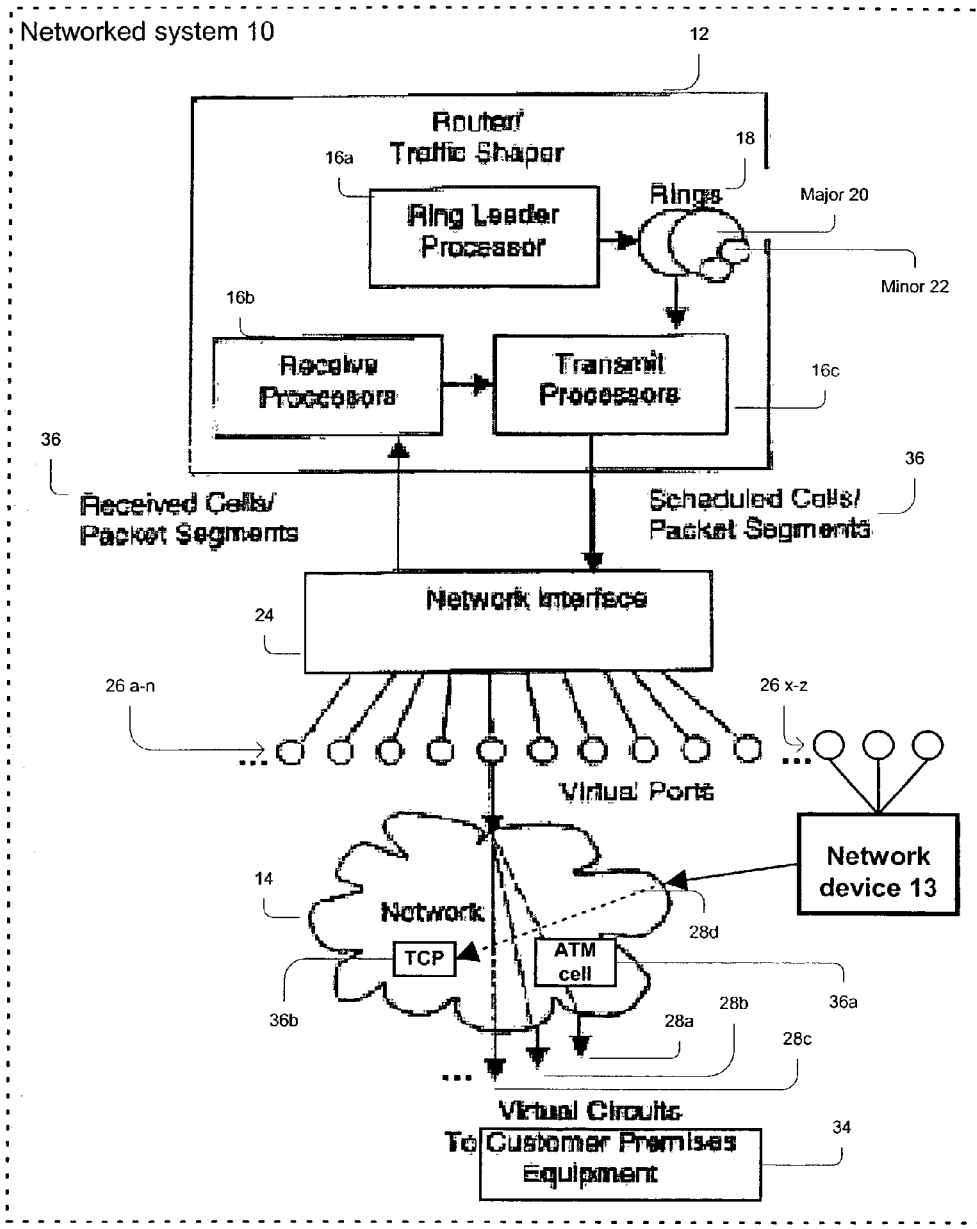
FIG. 1 is a block diagram of functional units in a router/traffic shaper.

Referring to FIG. 1, a networked system 10 includes a router/traffic shaper 12 connected to a network 14. Router/traffic shaper 12 uses a procedure and structures to transmit cells or segments to the satisfaction of virtual connection rates and virtual port rates. The structures include a major ring and a minor ring denoted in FIG. 1 as rings 20 and 22, respectively, in rings 18. Network 14 supports DSL network traffic. Router/traffic shaper 12 includes multiple processors 16. Ring leader processor 16a sets up major rings 20 and minor rings 22 as data structures that govern transmit timing of traffic departing router/traffic shaper 12 via network interface 24.

Nodes of major ring 20 represent time slots on a transmit processor 16c organized in a sequence. The time slots are approximately equal in size, as measured in processor cycles of transmit processor 16c. Collectively, the nodes of major ring 20 represent a sequence of time slots in a transmission cycle of router/traffic shaper 12. Major ring 20 apportions these times slots to virtual ports 26a–n by associating major nodes with minor rings 22, since each minor ring 22 is uniquely associated with a virtual port 26. Each minor ring 22 has its own sequence of minor nodes, each of which can be associated with a scheduled virtual connection 28. Each minor ring 22 also manages all unscheduled virtual connections 28 associated with the relevant virtual port 26. Conceptually, therefore, a major ring 20 is a schedule of service to virtual ports 26, while a minor ring 22 is a schedule of service to virtual connections 28 within a given virtual port 26. Overall, major ring 20 and multiple minor rings 22 encode a schedule of service to virtual connections 28 belonging to multiple virtual ports 26 on router/traffic shaper 12.

Service rates for virtual connections 28 can be guaranteed by the encoding of major ring 20 and minor rings 22. Service to a virtual connection 28 is scheduled by allocating nodes of major ring 20 and minor ring 22. Specifically, virtual connection 28 is scheduled into virtual port 26 via a node of minor ring 22, and minor ring 22 is scheduled into major ring 20. Sufficient major nodes are allocated, with sufficiently regular spacing within major ring 20, to ensure that the service rate for virtual connection 28 is satisfied in terms of throughput and regularity.

A given minor ring 22 can be associated with more than one major node. Indeed, each major node with which minor ring 22 is associated increases the number of time slots allocated to minor ring 22, and therefore to its associated virtual port 26. Therefore, increasing the number of time slots allocated to minor ring 22 increases the rate at which data is transmitted to the associated virtual port 26.

Traffic includes packet cells 36a or segments 36b appropriate to a network protocol of network 14: commonly, 48 byte ATM cells or 64 byte frame segments. For simplicity, packet cells or segments 36 will be referred to as simply "cells" 36.

Multiple major rings 20 can co-exist. Virtual ports 26 partition virtual connections 28. Major rings 20 partition virtual ports 26.

Router/Traffic Shaper

Figure 2:
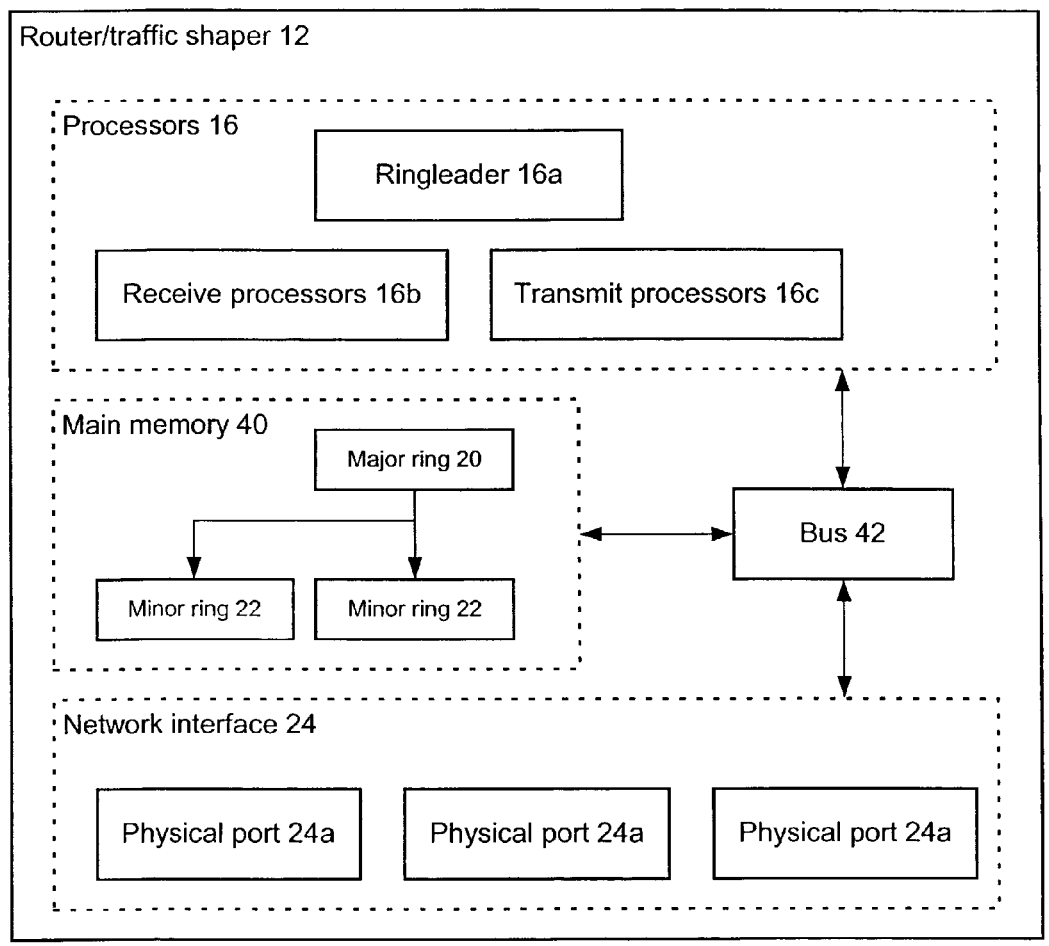
FIG. 2 is a block diagram of physical elements in a router/traffic shaper.

Referring to FIG. 2, router/traffic shaper 12 includes one or more processors 16. Processors 16 run threads that perform functions of ring leader processor 16a, receive processor 16b, and transmit processor 16c. Processor 16 can run more than one thread. Ring leader processor 16a runs a thread that manages major rings 20 and minor rings 22 stored in main memory 40. Receive processor 16b runs a thread that receives cells 36 from the network 14. Transmit processor 16c runs a thread that transmits cells 36 back onto the network 14.

Network interface 24 contains physical ports 24a to which transmission media are attached, carrying communication between network interface 24 and network 14. Bus 42 interconnects processors 16, main memory 40, and network interface 24.

Virtual ports 26 can be any ports in network 14, whether remote or local to network interface 24. For instance, referring to FIG. 1, virtual ports 26a–n are ports on network interface 24, while ports 26x–z are ports on a network device 13.

Referring to FIG. 1, router/traffic shaper 12 transmits to one or more virtual connections 28, such as virtual connections 28a–d. In the example illustrated in FIG. 1, virtual connections 28a–c are virtual circuits connecting to customer premises equipment 34, while virtual connection 28d is an Internet TCP connection.

Processors

Figure 3:
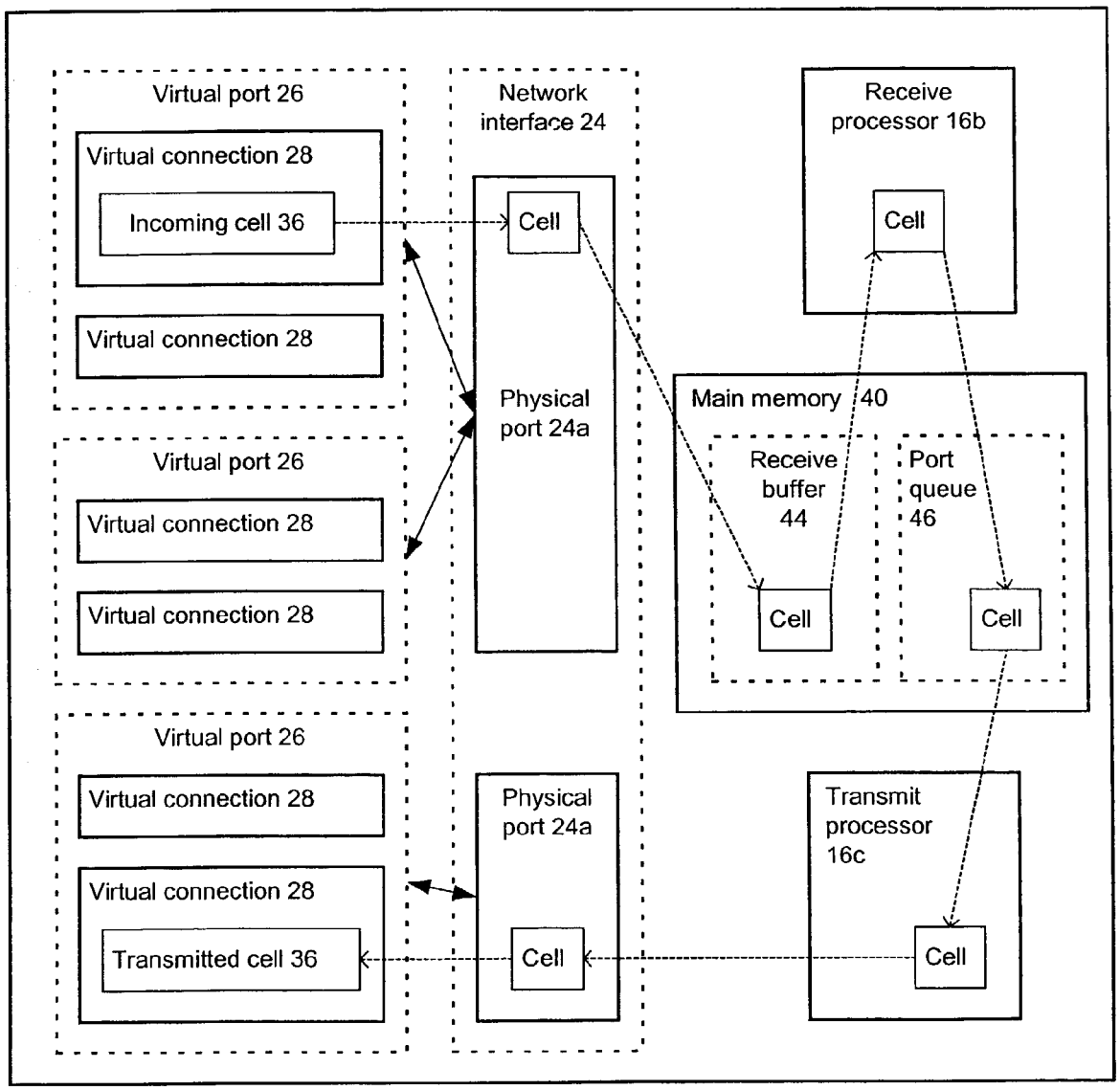
FIG. 3 shows the movement of a traffic cell in a router/traffic shaper.

Referring to FIG. 3, receive processors 16b receive cells 36 from network 14. Each cell 36 is associated with virtual connection 28 in virtual port 26. In the example of FIG. 3, virtual port 26 is associated with physical port 24a in network interface 24. However, in general, virtual port 26 may conceptually represent a physical port not in network interface 24 of the local router/traffic shaper 12, but on a remote device. In this case, virtual port 26 is associated with physical port 24a in network interface 24 to the degree that traffic passes through physical port 24a en route to the remote port represented by virtual port 26.

Incoming cells 36 arrive in receive buffer 44 in main memory 40. Receive processors 16b validate cells 36 from receive buffer 44 and stage them in port queue 46 in main memory 40, pending transmission by transmit processor 16c. Receive processors 16b also perform lookups such as routing table lookups and associating incoming cell 36 with a destination virtual connection 28, which is the particular virtual connection 28 on which cell 36 will be transmitted. Destination virtual connection 28 is associated with a destination virtual port 26. Each virtual port 26 has an affiliated port queue 46.

Receive processors 16b also perform classifications such as determining a data rate associated with the destination virtual connection 28.

Transmit processors 16c dequeue cells 36 from port queue 46. A transmit processor 16c performs a traffic shaping process 66 (shown in FIG. 6) to transmit cells 36 at specified bit rates appropriate to their destination virtual connections 28, as will be explained.

An example of a commercial available processor 16 is the IXP1200 Network Processor, which includes several, for example six, microengines. Each microengine executes machine-readable instructions and supports up to four simultaneous threads. The IXP1200 is manufactured by Intel Corporation.

Virtual Circuits and Virtual Ports

Figure 4:
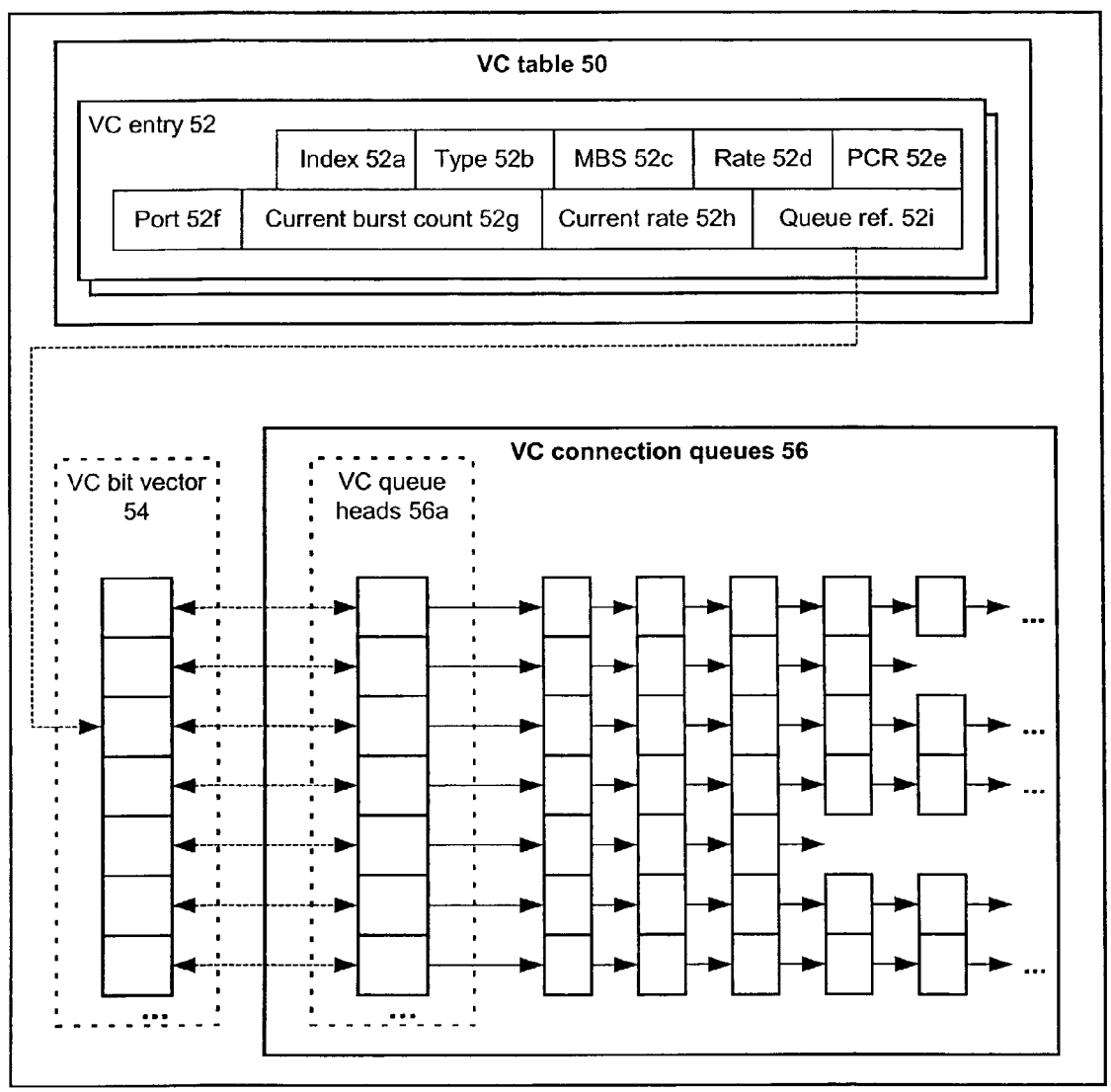
FIG. 4 is a block diagram of a virtual connection table.

Referring to FIG. 4, a virtual connection 28 represents a stateful communication setup, such as an ATM virtual circuit or Internet TCP connection. VC table 50 is a table of virtual connections 28. VC table 50 includes VC entries 52. A VC entry 52 contains information for a given virtual connection 28, including VC index 52a, type 52b, MBS 52c, rate 52d, PCR 52e, port 52f, current burst count 52g, current rate 52h, and queue reference 52i. Virtual connection 28 has a quality of service or rate specification, or rate 52d. Virtual connection 28 also has VC index 52a, which gives the position of virtual connection 28 in VC table 50. Type 52b specifies a type of service rate for virtual connection 28, such as CBR, VBR, or UBR. Port 52f specifies a virtual port 26 which virtual connection 28 uses. Current burst count 52g and current rate 52h are dynamic properties of virtual connection 28 that are determined by the transmission of data onto virtual connection 28. Transmit processors 16c maintain the values of current burst count 52g and current rate 52h. Current burst count 52g and current rate 52h can be used to determined whether the current state of virtual connection 28 is within defined traffic parameters, for instance MBS 52c and rate 52d, respectively. Queue reference 52i gives an offset into VC bit vector 54 for virtual connection 28.

Virtual ports 26 have specified data rates that can be measured and constrained. The actual rate of service to virtual port 26 in the present embodiment is a function of the number of time slots allocated to it: more time slots yield a higher rate. Other factors affecting rate include the size of the time slot (in processor cycles, i.e., step rate 70b of major ring 20, shown in FIG. 6) and the amount of data transmit processor 16c can transmit in a cycle. One constraint consideration when configuring virtual port 26 is the rates of virtual connections 28 allocated to virtual port 26. Allocation is limited such that the sum of the minimum service rates for virtual connections 28 does not exceed the desired rate of virtual port 26. This ensures that all virtual connections 28 on virtual port 26 can be serviced to their minimum rates.

All virtual port 26 rates associated with major ring 20 are multiples of step rate 70b of major ring 20.

VC bit vector 54 contains bits corresponding to VC connection queues 56 and VC queue heads 56a, as will be explained. Each VC connection queue 56 has a VC queue head 56a that anchors the queue and persists even when the queue is empty.

Rings

Figure 5:
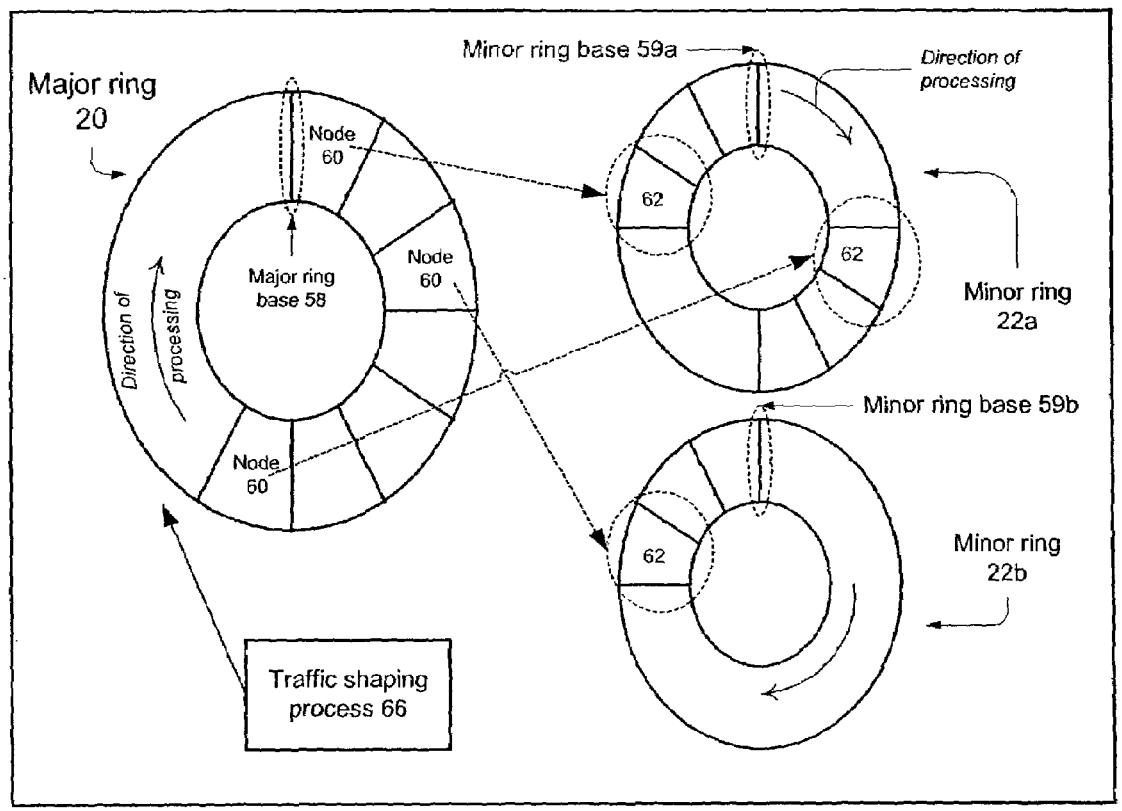
FIG. 5 illustrates a major ring and minor rings.

Referring now to FIG. 5, a major ring 20 is affiliated with multiple minor rings 22. There can be multiple major rings 20, each governing transmission to a subset of the total virtual ports 26. For example, if there are two thousand forty-eight (2048, or $2^{11}$) virtual ports 26, eight major rings 20 could each be configured to represent two hundred fifty-six virtual ports 26.

Major ring 20 and minor ring 22 are shown in FIG. 5 as circular structures to indicate their conceptual ring structure, i.e., iterations begun at the head of each ring will typically proceed to the end and then wrap around to the head again when the previous iteration is complete. Major ring 20 and minor ring 22 are each stored in memory 40 as an array.

Major ring 20 has a base 58 at which ring 20 begins in memory 40. Similarly, minor rings 22a and 22b have bases 59a and 59b, respectively.

Major ring 20 includes a sequence of major nodes 60. Minor ring 22 includes a sequence of minor nodes 62.

Major Rings

Major ring 20 is a data structure representing time slots scheduled on transmit processor 16c. Major ring 20 includes a sequence of major nodes 60. The sequence indicates the scheduled order of the transmission opportunities for minor rings 22. Traffic shaping process 66, as will be explained in more detail, cycles over the sequence of nodes 60 repeatedly to select virtual port 26, and more specifically virtual connection 28 within virtual port 26, to receive cells 36 for transmission. Thus, nodes 60 in major ring 20 encode a schedule of transmissions to virtual ports 26 and virtual connections 28.

Figure 6:
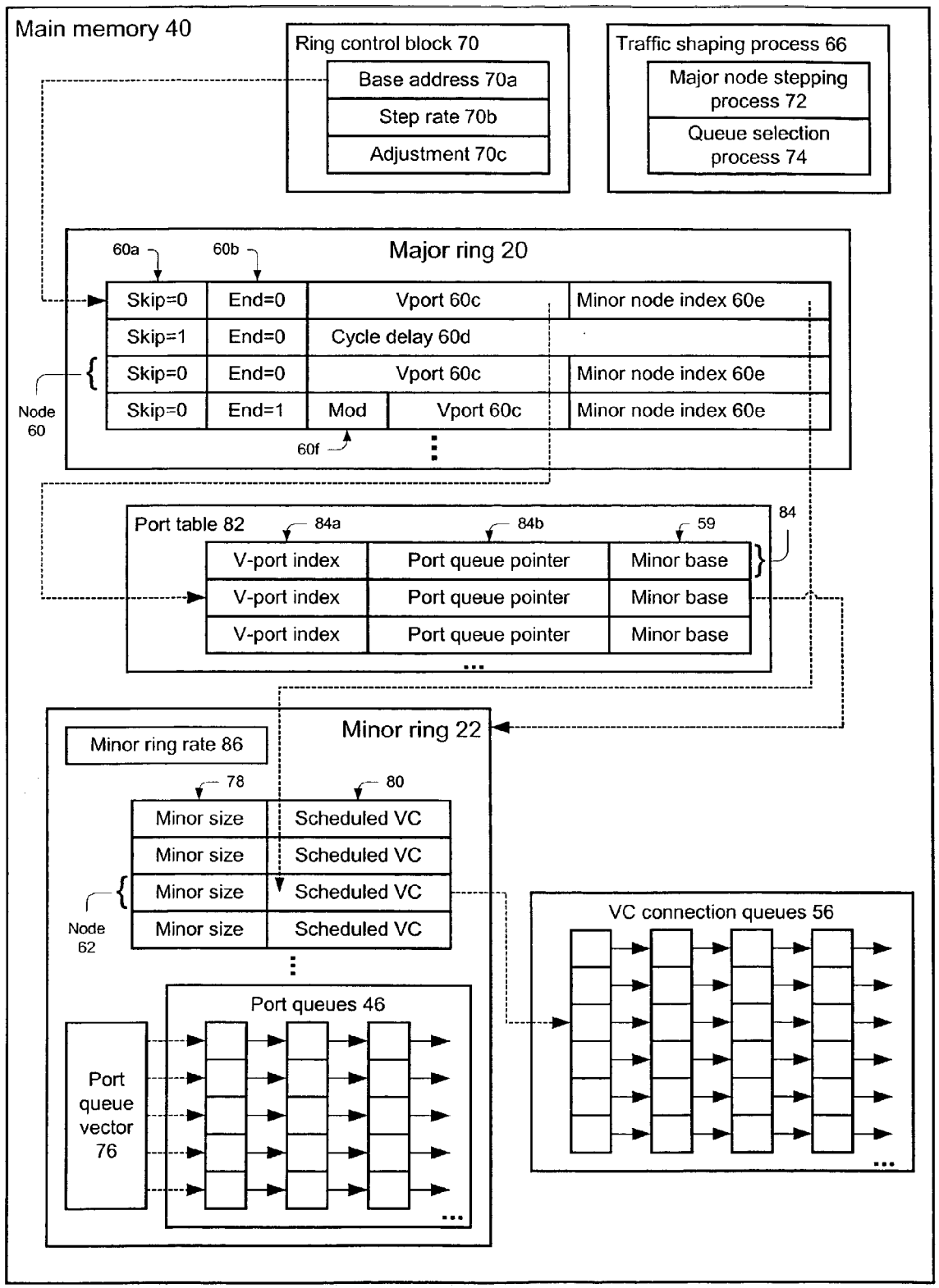
FIG. 6 is a block diagram of major and minor ring data structures.

Node 60 in major ring 20 represents a time slot in which traffic can be transmitted. Step rate 70b, as shown in FIG. 6 in the ring control block 70, also known as a base rate, measures the duration of a time slot of major ring 20 in terms of processor cycles. Step rate 70b specifies the interval, in terms of processor cycles, that should occur between transmissions. When virtual port 26 has a transmission rate approximately equal to step rate 70b, associated minor ring 22 is entered once in major ring 20. (That is, in this case associated minor ring 22 corresponds to a single node 60.) When virtual port 26 has a rate twice step rate 70b, virtual port 26 is entered in two nodes 60, and so forth. All virtual port 26 rates associated with a given major ring 20 are approximately multiples of step rate 70b.

There is a benefit to spacing the nodes 60 that reference a minor ring 22 such that the nodes 60 are widespread throughout major ring 20. If references to a given minor ring 22 are not widespread but are bunched, then a region tightly enclosing the bunched references represents a period of time in which the minor ring 22 has a disproportionate amount of its opportunity for service, while the rest of major ring 20 has a disproportionately small amount of such opportunity. If it should happen that the virtual port 26 associated with the minor ring 22 is blocked during that period of service, then the reduced opportunity for service means that virtual port 26 has fewer chances later to recover from a temporary blockage within the current cycle of major ring 20.

Node 60 can be without reference to any minor ring 22; in this case it is called a "skip node". Adding gaps to a transmission schedule is also known as "port conserving".

Referring to FIG. 6, major ring 20 has ring control block 70. Ring control block 70 is a data structure that includes base address 70a, step rate 70b, and adjustment 70c. Base address 70a is the address in main memory 40 at which the data structure for major ring 20 begins. Adjustment 70c contains a number of processor cycles to wait before beginning a next iteration of major ring 20. Adjustment 70c therefore allows the period of the cyclic iteration of major ring 20 to be adjusted, so that the period need not depend entirely on the number of nodes 60 in major ring 20.

The speed of major ring 20 is the amount of data it can transmit per unit time—usually, bits per second. Speed depends on size (in nodes) of major ring 20, step rate 70b, adjustment 70c, and the number of bits that transmit processor 16c can transmit per processor cycle.

Creating different major rings 20 having different step rates 70b allows virtual connections 28 to be managed at various transmit granularities. A low-speed virtual connection 28 in general does not need as many, or as frequent, time slot opportunities as a higher-speed virtual connection 28.

Major Nodes

Referring still to FIG. 6, data structures in memory 40 include a ring control block 70, a major node ring 20, and a minor ring 22. Traffic shaping process 66 is a method encoded in computer-executable instructions. Traffic shaping process 66 manages transmission of traffic onto virtual connections 28, using the major node stepping process 72 in collaboration with a queue selection process 74. The major node stepping process 72 repeatedly cycles over major nodes 60 in major ring 20. The stepping process 72 examines major nodes 60 to select minor rings 22, along with particular locations within minor ring 22 given by major nodes 60, for consideration by the queue selection process 74. The queue selection process 74 allocates a transmission opportunity to a particular virtual connection 28 on virtual port 26, based on service rates. The queue selection process 74 prioritizes virtual connections 28 that have minimum rate requirements above virtual connections 28 that have unspecified rate requirements.

A major node 60 includes fields for skip flag 60a, end flag 60b, v-port 60c, cycle delay 60d, minor node index 60e, and modify 60f.

Skip flag 60a is one binary bit. When node 60 is associated with minor ring 22 (as is the case for the first, third, and fourth nodes 60 shown), skip flag 60a is set to zero and node 60 has fields for v-port 60c and minor node index 60e.

V-port 60c specifies virtual port 26 associated with node 60. Specifically, v-port index 82a is an index of port table 82. Port table 82 contains entries 84 for each virtual port 26. The value of a given v-port 60c corresponds to the value of v-port index 84a for some entry 84 in port table 82.

Entry 84 provides corresponding port queue vector 76 and minor base 59. Specifically, minor base 59 contains the address of minor ring 22 within main memory 40. Port queue pointer 84b provides an offset into port queues 46 that specifies the particular entry of port queue vector 76 to use.

Minor node index 60e gives the position of a specific minor node 62 within minor ring 22. In combination with v-port 60c, minor node index 60e allows major node 60 to reference both a specific minor ring 22 and a specific location (node 62) within minor ring 22. Traffic shaping process 66 can update minor node index 60e. For example, traffic shaping process 66 can increment minor node index 60e to refer to a next minor node 60 after a transmission involving a first minor node 60.

When node 60 is not associated with any minor ring 22 (as with the second node 60 shown, for example), skip flag 60a is set to one, and node 60 has cycle delay 60d. Cycle delay 60d fills unused cycles in the event major ring 20 is not fully populated. Cycle delay 60d causes the transmit thread to delay a number of cycles equal to step rate 70b major ring 20 before proceeding to the next major node 60.

End flag 60b is one binary bit. The last node 60 in major ring 20 has end flag 60b set to one, indicating the transmit thread should wrap and start at the beginning of major ring 20. If end flag 60b equals one and modify 60f equals one, the transmit thread follows major ring reload process 98g, shown in FIG. 9, as will be explained. Ultimately, the transmit thread rereads ring control block 70 and examines major ring 20 given by base address 70a. In this manner, major ring 20 can be updated with little overhead to the transmit thread, by directing base address 70a to an updated version of major ring 20 and setting modify 60f to one.

Minor Rings

Still referring to FIG. 6, minor ring 22 contains data structures describing virtual port 26. Minor ring 22 contains a sequence, stored in memory 40 as a ring array, of nodes 62 representing time slots for transmission opportunities. The sequence indicates the scheduled order of the transmission opportunities for virtual connections 28 associated with virtual port 26. The sequence can be iterated over repeatedly. Node 62 of minor ring 22 is associated with a virtual connection 28 scheduled for transmission, if possible, at the time that node 62 is processed by the transmit thread. Other virtual connections 28 are available for transmission if the scheduled virtual connection 28 is unavailable or has no data awaiting transmission. Thus, broadly speaking the data structures of minor ring 22 encode a schedule that prioritizes virtual connections 28 on virtual port 26 and allows other, less-prioritized virtual connections 28 to be selected on a stand-by basis.

Nodes 62 of minor ring 22 contain minor size 78 and scheduled VC 80. Minor size 78 is the size of minor ring 22. Scheduled VC 80 contains a value indicating the VC index 52a of the virtual connection 28 associated with node 62. Typically, this virtual connection 28 has a rate 52d that requires it to be serviced at least at a predetermined rate, i.e., a minimum. Virtual connection 28 is scheduled into virtual port 26, and virtual port 26 is scheduled into major ring 20, with sufficient frequency (i.e., sufficient major nodes referencing minor ring 22 associated with virtual port 26, with sufficient spacing within major ring 20) to ensure that the corresponding rate 52d is satisfied.

Minor size 78 is stored redundantly on every node 62. Minor size 78 and scheduled VC 80 together fit in thirty-two (32) bits, making only one memory read necessary by the processor.

Minor ring 22 also includes minor ring rate 86, a data structure for storing the effective current rate of the virtual port 26 corresponding to the minor ring 22. Traffic shaping process 66 tests minor ring rate 86 to keep the performance of virtual port 26 within its prescribed v-port speed 97d (shown in FIG. 9).

Port queue vector 76 is a bit vector where each bit position corresponds to port queue 46 in a collection of port queues 46. The collection of port queues 46 has up to sixteen members, each of a different priority. Port queue 46 contains linked lists where each node is associated with virtual connection 28 by a value indicating VC index 52a of virtual connection 28. Virtual connections 28 referenced by port queues 46 have unspecified bit rates for their rate 52d; they are not guaranteed to transmit. If a given virtual connection 28 requires a guaranteed minimum bit rate, it is scheduled via scheduled VC 80 field of some minor node 62.

A bit position in port queue vector 76 is an emptiness indicator for a corresponding port queue 46. If a bit position in port queue vector 76 has a value of one, the corresponding port queue 46 has data awaiting transmission. Otherwise, port queue 46 is empty. When queuing packets for virtual connection 28, receive processors 16b set the corresponding bit in port queue vector 76 to one. When a transmit thread empties port queue 46, transmit thread sets the corresponding bit to zero.

Also shown in FIG. 6 is a table of VC connection queues 56. These also are linked list queues, each associated with some virtual connection 28. Given VC index 52a, the transmit thread can go to the associated VC connection queue 56 to get packet descriptor information for the packet at the head of the queue.

Figure 7:
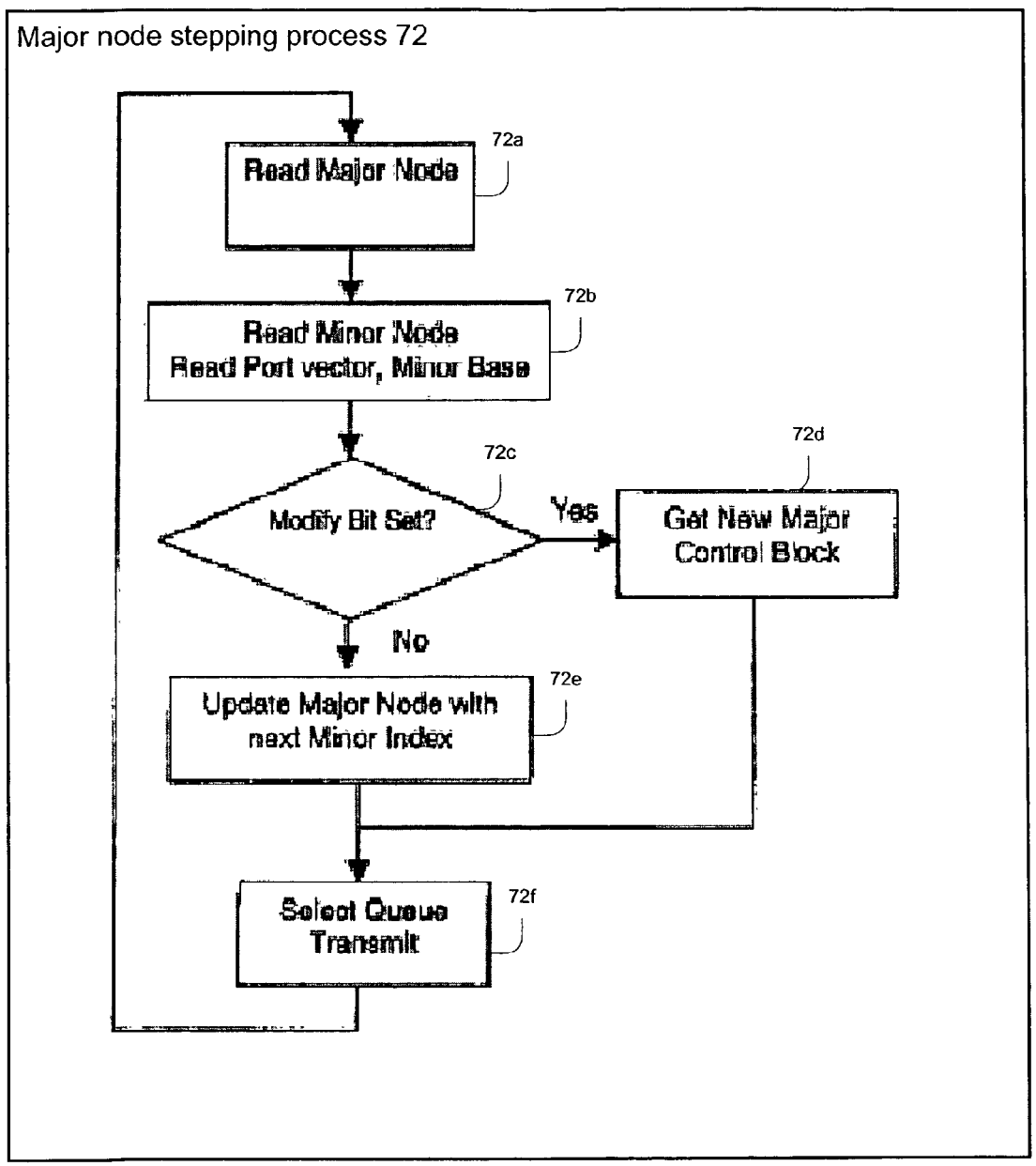
FIG. 7 is a flowchart of a major node stepping process.

Referring now to FIG. 7, major node stepping process 72 steps sequentially through major nodes 60. Major node stepping process 72 reads major node 60 (procedure 72a). If skip flag 60a of node 60 has a value equal to one, major node stepping process 72 allows the processor processing its thread the option of processing a different thread until the cycle delay is complete. Major node stepping process 72 then reads the next major node 60, repeating until node 60 is associated with some minor node 62.

Major node stepping process 72 reads minor node 62 (procedure 72b). If modify 60f equals one (procedure 72c), major node stepping process 72 follows major ring reload process 98g, shown in FIG. 9, as will be explained. Ultimately, if modify 60f equals one, major node stepping process 72 reads a new ring control block 70 (procedure 72d) and proceeds to procedure 72f. If modify 60f equals zero (procedure 72c), however, major node stepping process 72 calculates the next minor node index 60e by adding one and wrapping to minor base 59 if the new minor node index 60e is equal to the sum of minor base 59 and minor size 78 (procedure 72e). Major node stepping process 72 then obtains from major node 60 information on virtual port 26 and minor node 62; selects virtual connection 28 for transmission using queue selection process 74 (procedure 72f); and transmits one or more cells 36. From there, major node stepping process 72 repeats, reading another major node 60 (procedure 72a), and so forth. When major node stepping process 72 reaches the last major node 60 in the sequence of major nodes 60 in major ring 20, major node stepping process 72 returns to the first major node 60. This repetition or looping, which causes major node stepping process 72 to iterate repeatedly over all major nodes 60 in major ring 20, is sometimes called "cycling".

Transmission in procedure 72f is subject to traffic parameters of virtual connection 28, such as MBS 52c and rate 52d (shown in FIG. 4), as well as to the state of virtual port 26, such as v-port speed 97d or a port blockage due to flow control. For instance, to determine whether the current state of virtual connection 28 is within defined traffic parameters, major node stepping process 72 can compare current burst count 52g and current rate 52h to MBS 52c and rate 52d, respectively.

Figure 8:
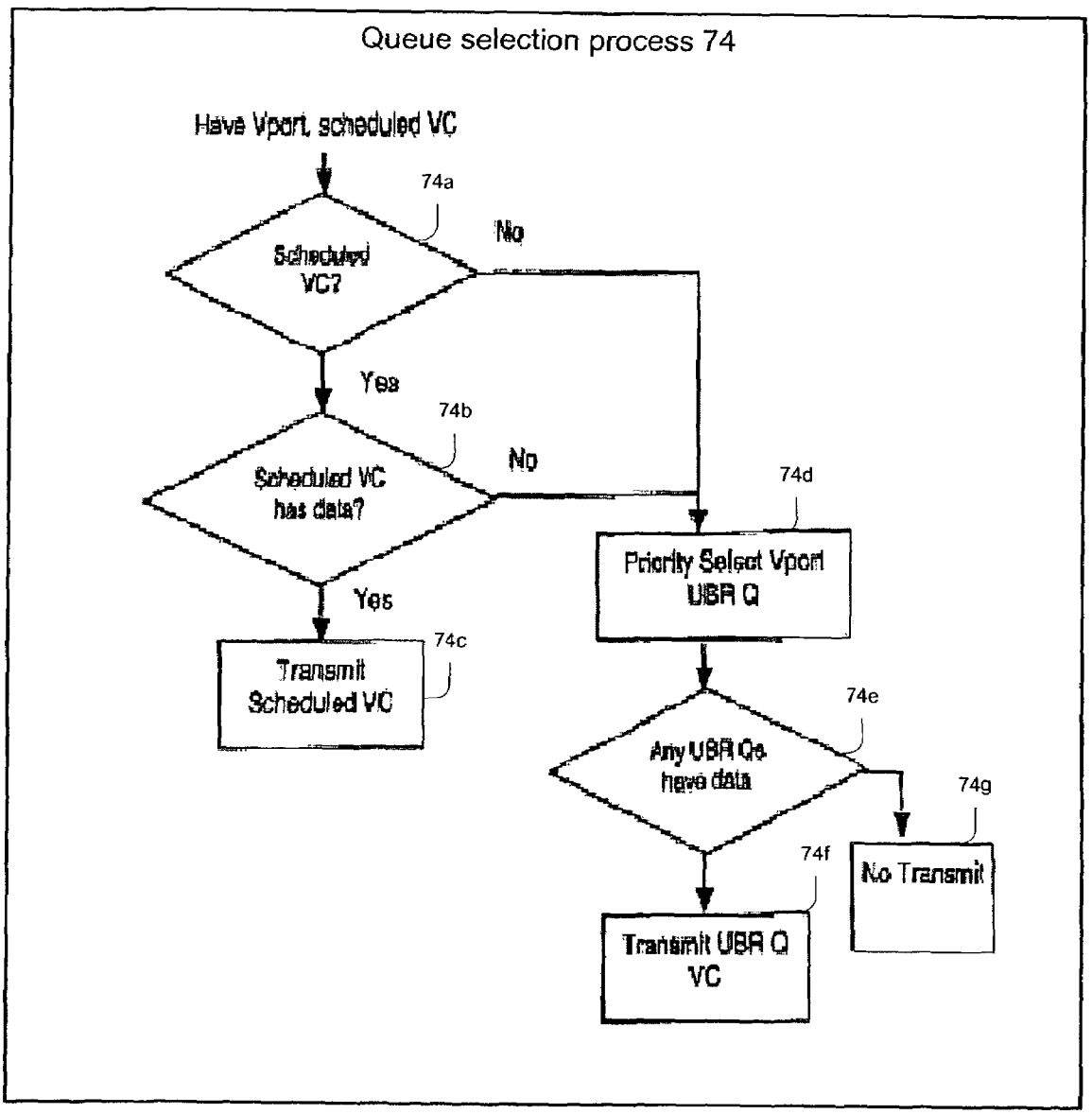
FIG. 8 is a flowchart of a queue selection process.

Referring now to FIG. 8, queue selection process 74 operates on minor node 62. If minor node 62 has a scheduled VC 80 value greater than zero (procedure 74a), queue selection process 74 tests virtual connection 28 associated with scheduled VC 80 for data to transmit (procedure 74b) by examining VC connection queues 56. If such data exists, queue selection process 74 selects scheduled VC 80 for transmission (procedure 74c). If scheduled VC 80 value is zero, however, or if no such data exists, queue selection process 74 performs a priority selection of port queue vector 76 (procedure 74d)—that is, queue selection process 74 considers virtual connections 28 having an unspecified bit rate (UBR). The priority selection uses a deficit round-robin algorithm to find the index of port queue 46 with the highest priority, among port queues 46 that have data to transmit (procedure 74e). If queue selection process 74 finds a suitable port queue 46, queue selection process 74 specifies virtual connection 28 associated with port queue 46 for transmission (procedure 74f). Otherwise, queue selection process 74 does not select any virtual connection 28 for transmission (procedure 74g).

Ring Leader

Figure 9:
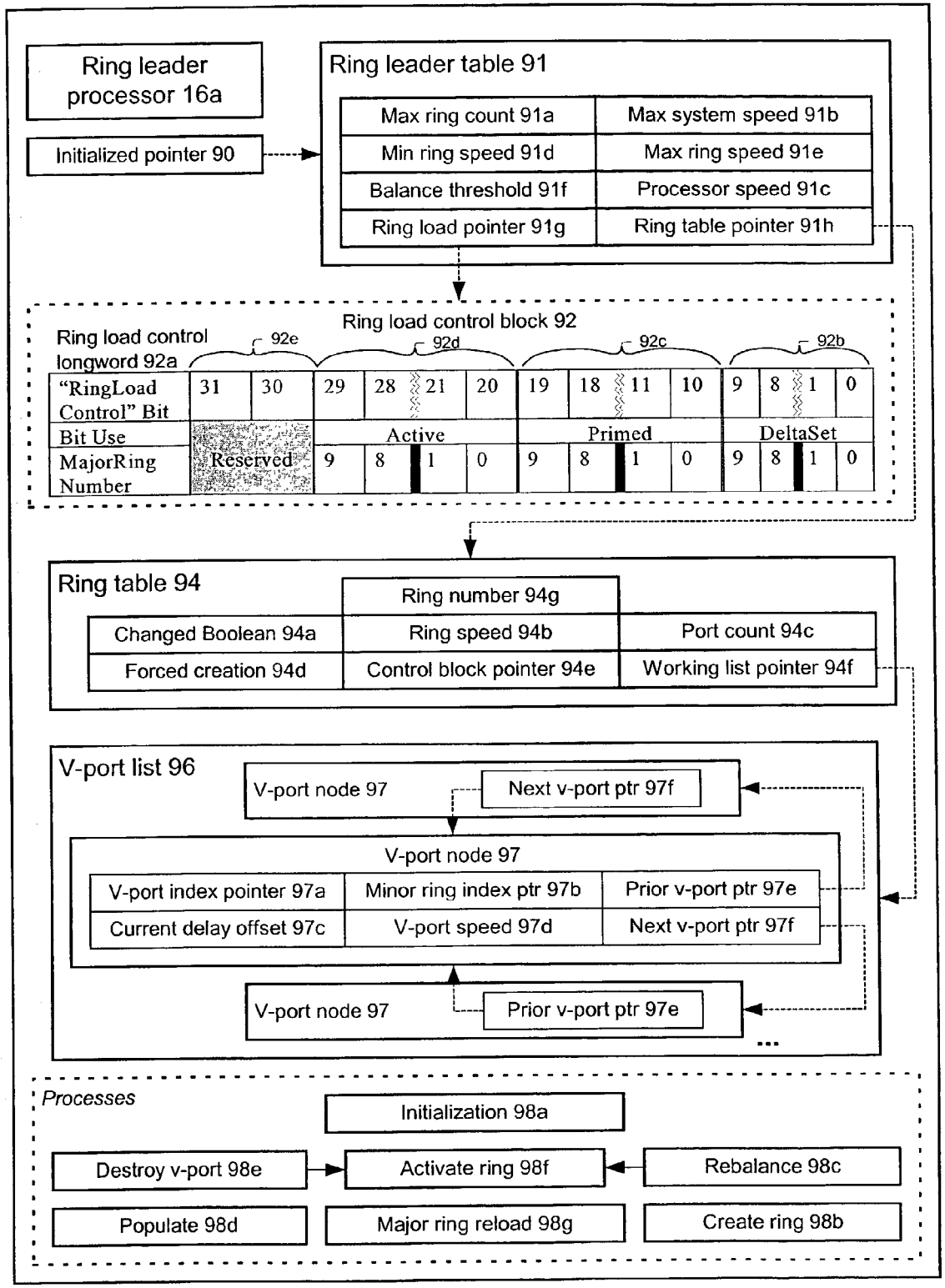
FIG. 9 is a block diagram of ring leader data structures and processes.

Ring leader processor 16a performs administrative and control tasks necessary to the operation of major rings 20 and minor rings 22. Such tasks include initializing, updating, and deleting major rings 20, minor rings 22, and virtual ports 26. Referring to FIG. 9, ring leader processor 16a maintains data structures including initialized pointer 90, ring leader table 91, ring load control block 92, ring table 94, and v-port list 96. Ring leader processor 16a performs processes including initialization process 98a, create ring process 98b, rebalance process 98c, populate process 98d, destroy v-port process 98e, activate ring process 98f, and major ring reload process 98g.

Initialized pointer 90 is a global pointer set to either null or the location of the working ring leader table 91.

Ring Load Control Block

Ring load control block 92 is a data structure that assists in making major rings 20 available for use, by loading them into main memory 40. Ring load control block 92 includes at least one ring load control longword 92a, which is a longword in main memory 40. Ring load control block 92 is located prior to the beginning of the memory range for ring control block 70 (shown in FIG. 6).

Referring to FIG. 9, ring load control longword 92a includes thirty-two (32) bits of four types: DeltaSet bit 92b, primed bit 92c, active bit 92d, and reserved bit 92e. A given ring load control longword 92a contains two bits designated reserved bit 92e. The remaining thirty bits are equally divided among DeltaSet bits 92b, primed bits 92c, and active bits 92d, such that a trio of one each DeltaSet bit 92b, primed bit 92c, and active bit 92d can correspond to one major ring 20. Thus, one ring load control longword 92a supports up to ten major rings 20. Multiple ring load control longword 92a can be distinguished by the two bits designated reserved bits 92e (allowing a total of forty major rings 20). If more than one ring load control longword 92a is allocated, the first will be used for rings zero through nine, the second longword for rings ten through nineteen, and so on.

Ring leader processor 16a initializes all bits of ring load control longword 92a to a zero value.

A thread running on transmit processor 16c and processing major ring 20 uses major ring reload process 98g to reload major ring 20 after initialization or modifications. Major ring reload process 98g allows multiple major rings 20 to be synchronized with other major rings 20, so that updates do not take effect until all microengines using major rings 20 in the synchronized set are prepared to reload. Note that this approach also allows the simple case of one major ring 20 being updated, via a synchronized set with one element, without regard to other major rings 20.

When multiple major rings 20 are used simultaneously, each major ring 20 can have its own step rate 70b. In this way, major rings 20 can be allocated varying percentages of the total bandwidth managed by router/shaper 12. Skip nodes 60 or other timing control mechanisms, as will be explained, can account for time not used by a given major ring 20.

For a given major ring 20, major ring reload process 98g uses the corresponding DeltaSet bit 92b to indicate that major ring 20 is implicated in a set of changes to be synchronized with other major rings 20. DeltaSet bit 92b may only be set and cleared by ring leader processor 16a.

Primed bit 92c indicates that the microengine associated with major ring 20 acknowledges that major ring 20 is part of the synchronized set. Primed bit 92c with value equal to one indicates that the microengine will stop processing major ring 20 until major ring 20 has been reloaded. Primed bit 92c may only be set by the relevant microengine and cleared by ring leader processor 16a. The relevant microengine is the one processing the associated major ring 20. The microengine sets primed bit 92c after reading modify 60f with value of one, checking the relevant DeltaSet bit 92b, and entering a wait state pending coordination of the synchronized set.

Active bit 92d indicates that the microengine associated with major ring 20 has reloaded major ring 20 and is now actively processing. Active bit 92d may only be set by the microengine and cleared by ring leader processor 16a.

Ring Leader Table

Ring leader table 91 stores global parameters used by ring leader processor 16a. Ring leader table 91 includes fields for max ring count 91a, max system speed 91b, processor core speed 91c, minimum ring speed 91d, maximum ring speed 91e, ring balance threshold 91f, ring load control pointer 91g, and ring table pointer 91h. Max ring count 91a stores the maximum number of major rings 20 that may be created by ring leader processor 16a. Max system speed 91b stores the maximum speed of all rings running under the control of ring leader processor 16a. Processor core speed 91c stores the operation speed of the microengine core, and is used to calculate step rate 70b and cycle delay 60d for major rings 20. Minimum ring speed 91d stores the slowest permissible speed for major rings 20. Minimum ring speed 91d is greater or equal to 2. Maximum ring speed 91e stores the fastest permissible speed for major rings 20. Maximum ring speed 91e is greater than or equal to minimum ring speed 91d, and less than or equal to processor core speed 91c. Ring balance threshold 91f provides the percentage of a ring to be filled before starting a new ring of the same size. Ring load control pointer 91g stores a pointer to ring load control block 92. Ring table pointer 91h stores a pointer to ring table 94.

Ring Table

Ring table 94 collects information useful to ring leader processor 16a and specific to individual major rings 20. Each entry in ring table 94 corresponds to one major ring 20 and includes the following fields: changed Boolean 94a, ring speed 94b, port count 94c, forced creation 94d, control block pointer 94e, working list pointer 94f, and ring number 94g. Changed Boolean 94a is a Boolean value indicating whether the table entry for major ring 20 is being modified. Ring speed 94b stores the operation speed of major ring 20. Port count 94c stores the number of virtual ports 26 in the major ring 20. Forced creation 94d indicates that major ring 20 was explicitly created by the end user application, such as using create ring process 98b with explicit flag of one. Control block pointer 94e is a pointer to ring control block 70 for major ring 20. Working list pointer 94f is a pointer to v-port list 96, the linked list used to construct major ring 20. Ring number 94g numbers each entry of ring table 94 and uniquely identifies its corresponding major ring 20 within router/traffic shaper 12.

V-Port List

Ring leader processor 16a uses v-port list 96 to construct major ring 20. V-port list 96 is a linked list of v-port nodes 97, each referencing one virtual port 26. Each v-port node 97 includes the following fields: v-port index pointer 97a, minor ring index pointer 97b, current delay offset 97c, v-port speed 97d, prior v-port pointer 97e, and next v-port pointer 97f. V-port index pointer 97a stores an index into port table 82. Minor ring index pointer 97b stores a value specifying virtual connection 28 to use as scheduled VC 80. Current delay offset 97c stores the amount of time to delay before allowing data to go out to virtual port 26, based on the last transmit. V-port speed 97d stores the speed at which virtual port 26 operates. V-port speed 97d can be used to calculate number of nodes 62 needed in major ring 20 to be allocated to virtual ports 26. Prior v-port pointer 97e and next v-port pointer 97f are pointers to the prior and next v-port nodes 97 in v-port list 96, respectively.

Initialization Process

Initialization process 98a defines and validates values used by ring leader processor 16a. Initialization process 98a returns a success code (given by Table 1) and sets initialized pointer 90 to point to ring leader table 91.

Initialization process 98a accepts parameters including initialized pointer 90, a major tables parameter, a port minimum speed parameter, a port maximum speed parameter, and a system max speed parameter. Initialization process 98a returns the following values: −1 to indicate undefined failure; −2 to indicate that the ring leader system is unable to be initialized because it is already running; −3 to indicate a memory allocation error; −4 to indicate speed validation failure; or 0 to indicate success.

If initialized pointer 90 has been set previously, then the system has already been initialized, so initialization process 98a returns the corresponding code.

Initialization process 98a reads the speed from the microengine and sets processor core speed 91c. Initialization process 98a sets the following other fields of ring leader table 91 based on values passed as arguments to initialization process 98a: max ring count 91a, max system speed 91b, minimum ring speed 91d, and maximum ring speed 91e. Initialization process 98a validates data, such as verifying that maximum ring speed 91e is greater than or equal to minimum ring speed 91d, and less than or equal to processor core speed 91c.

Initialization process 98a sets null pointer values for all undefined pointer elements.

Create Ring Process

Ring leader processor 16a uses create ring process 98b to force the creation of major ring 20 running at a given speed. The speed is passed as a parameter to create ring process 98b, along with parameters for ring leader table 91, ring number parameter, and an Explicit flag. Create ring process 98b returns true or false.

Create ring process 98b allows the user application to pre-allocate a mandatory major ring 20 running at a preset ring speed by setting the Explicit flag. Create ring process 98b also performs validations, such as verifying that the ring number parameter contains a value from 0 to the max ring count 91a of ring leader table 91, and that major ring 20 is free for the specified ring number 94g, before creating major ring 20 using the specified ring number 94g. In the event that the specified ring number parameter is invalid, or in use, the next available ring number 94g will be used.

Create ring process 98b returns false if initialized pointer 90 has not been initialized.

Create ring process 98b validates the given speed to be within or equal to minimum ring speed 91d and maximum ring speed 91e. The total of all the existing major ring 20 speeds within the system plus the desired speed of the new major ring 20 is less than or equal to the max system speed 91b.

Create ring process 98b sets changed Boolean 94a to one as it begins, and resets changed Boolean 94a to zero upon completion to prevent multiple definitions. If the explicit flag is set, create ring process 98b sets forced creation 94d to one to prohibit removal of this major ring 20 during normal ring rebalancing; otherwise, create ring process 98b sets forced creation 94d to zero. Create ring process 98b sets ring speed 94b to the validated ring speed and sets port count 94c to zero.

Rebalance Process

Ring leader processor 16a calls rebalance process 98c to rebalance major rings 20. Rebalance process 98c attempts to maintain an equal number of active time slots (i.e., time slots allocated for virtual ports 26) on each major ring 20. Rebalance process 98c can also free a time slot so a new major ring 20 running at a different speed may be created in a subsequent operation.

Rebalance process 98c accepts parameters including ring leader table 91, an empty ring desired flag, and an override forced creation flag.

Rebalance process 98c returns true or false: true if major rings 20 have been rebalanced and changes activated on the microengines, false if no new major ring 20 has been found or initialized pointer 90 has not been initialized. If a free major ring 20 was requested via the parameters, a return value of true also indicates a free major ring 20 has been found.

Rebalance process 98c makes an explicit call to activate ring process 98f for any major ring 20 that has changed, immediately prior to leaving (but not during) the routine.

Major rings 20 are balanced against the number of time slots being filled, which may be different than the number of virtual ports 26.

Rebalance process 98c can balance major rings 20 according to the rules given in Table 1.

TABLE 1

| Balancing Rules |
| --- |
| 1) Rebalance process 98c examines major rings 20 of equal speed and moves virtual ports 26 between each major ring 20 until an equal number of time slots is filled across all major rings 20 of that speed.<br>a) Rebalance process 98c adds virtual port 26 to major ring 20 by calling populate process 98d, passing the new major ring 20 for virtual port 26 as the major ring 20 value.<br>b) Rebalance process 98c deletes the old virtual port 26 by calling destroy v-port process 98e, passing the old ring number 94g.<br>2) All time slots for virtual ports 26 exist on the same major ring 20 and may not be split across major rings 20.<br>3) Rebalance process 98c examines smaller major rings 20 that are multiple factors of two, using two or more time slots on major ring 20 with smaller speed to create a sum total equal to the speed of virtual port 26.<br>4) Rebalance process 98c will not make moves until all elements on major ring 20 being balanced, have a place on another major ring 20.<br>5*) If the override forced creation flag passed to rebalance process 98c is set to false, all major rings 20 that were explicitly created are removed from the list of major rings 20 to be considered for removal.<br>6*) Rebalance process 98c examines smallest major ring 20 (i.e., major ring 20 having the smallest number of entries) to see if nodes 60 of major ring 20 may be inserted into one or more major rings 20 half (or successive factors of two) the size of smallest major ring 20. Multiple entries for virtual ports 26 are considered.<br>a) Rebalance process 98c repeats this procedure using major rings 20 with successively smaller ring speeds until all major rings 20 have been examined for elimination. |

TABLE 1-continued

Balancing Rules b) Once a given major ring 20 is identified, its changed Boolean 94a is set to true to prevent additions to that major ring 20.
7*) Rebalance process 98c finds "home" major rings 20 for virtual ports 26 and calls populate process 9Th, using ring number 94g of each home major ring 20 found.
8*) All values for major ring 20 are reset to zero or null, as applicable. Rebalance process 98c resets major ring 20 using activate ring process 98f so the microengine tables are rebuilt.

*Steps 5–8 only apply if the empty ring desired flag passed to rebalance process 98c is set to true.

Populate process 98d inserts virtual ports 26 into major rings 20.

Populate process 98d accepts parameters including ring leader table 91, a ring number parameter, a port index pointer, a port minor index pointer, and a virtual port speed. Populate process 98d returns −1 to indicate undefined failure, −2 to indicate no space available to insert into, or a value between zero and max ring count 91a to indicate ring number 94g where virtual port 26 was added successfully.

If the ring number parameter is in the range 0 to max ring count 91a, populate process 98d will only attempt an addition into major ring 20 having that ring number 94g. Any other value for the ring number parameter results in a "best match" insertion.

Populate process 98d does not create major rings 20 until the Balance percentage on all other rings of that speed are met.

A "best match" insertion tries to find a suitable major ring 20 to receive virtual port 26. Populate process 98d selects major ring 20 as follows. Populate process 98d first examines all major rings 20 operating at the same speed as virtual port 26, to determine major ring 20 with the least number of entries. In the case of a tie, populate process 98d selects major ring 20 with the highest ring number 94g. In the event that all major rings 20 running at the given speed are full, populate process 98d creates a new major ring 20 for virtual port 26.

Destroy V-Port Process

Destroy v-port process 98e removes a given virtual port 26 from a specified major ring 20. Activating the change requires a call to activate ring process 98f.

Destroy v-port process 98e accepts parameters including ring leader table 91, a port pointer, and a ring number parameter. The port pointer points to a specific virtual port 26. Destroy v-port process 98e returns the following values: −1 to indicate undefined failure; −2 to indicate that the specified virtual port 26 could not be found; −3 to indicate the ring number parameter is not valid; or 0 to the value of max ring count 91a, indicating the specified virtual port 26 has been successfully removed from the specified major ring 20.

Activate Ring Process

Activate ring process 98f builds and signals updates to the microengines.

Activate ring process 98f accepts parameters including ring leader table 91, a ring number parameter, and an update as set flag.

Activate ring process 98f waits for all major rings 20 to load their new versions, such as by using major ring reload process 98g. Activate ring process 98f also clears all bits of ring load control longword 92a before exiting, if a transaction is done as a synchronized set. The update as set flag indicates whether a transaction is to be done as a synchronized set.

To inform the microengines major ring 20 has been deleted, activate ring process 98f sets step rate 70b of deleted major ring 20 to zero. Subsequent loading of that major ring 20 is done as a synchronized set (which may contain as few as one major ring 20). Step rate 70b of zero indicates major ring 20 is not in use; thus, step rate 70b is the last value saved during an initialization or update of major ring 20 as a non-zero step rate 70b value signals a valid major ring 20 is now defined, if that control block was not in prior use.

More than one instance of activate ring process 98f can run at once. Activate ring process 98f waits until all other instances of itself have completed clearing ring load control longword 92a, such as from a prior synchronized set. If a ring activation is not part of a synchronized set, it may still continue as long as the DeltaSet bit 92b for the corresponding major ring 20 is not already set.

Schedule Ring and Port Ring Embodiment

In a second embodiment, a traffic shaper uses a procedure and data structures to transmit cells or segments to the satisfaction of both virtual connection rates and virtual port rates. The data structures include a schedule ring and a port ring.

Features of the first embodiment are common to the second embodiment, except as otherwise indicated. Element numbers will be shared between the two embodiments for similar elements. This description will sometimes refer to the first embodiment as the "major/minor" embodiment and to the second embodiment as the "schedule/port" embodiment.

Figure 10:
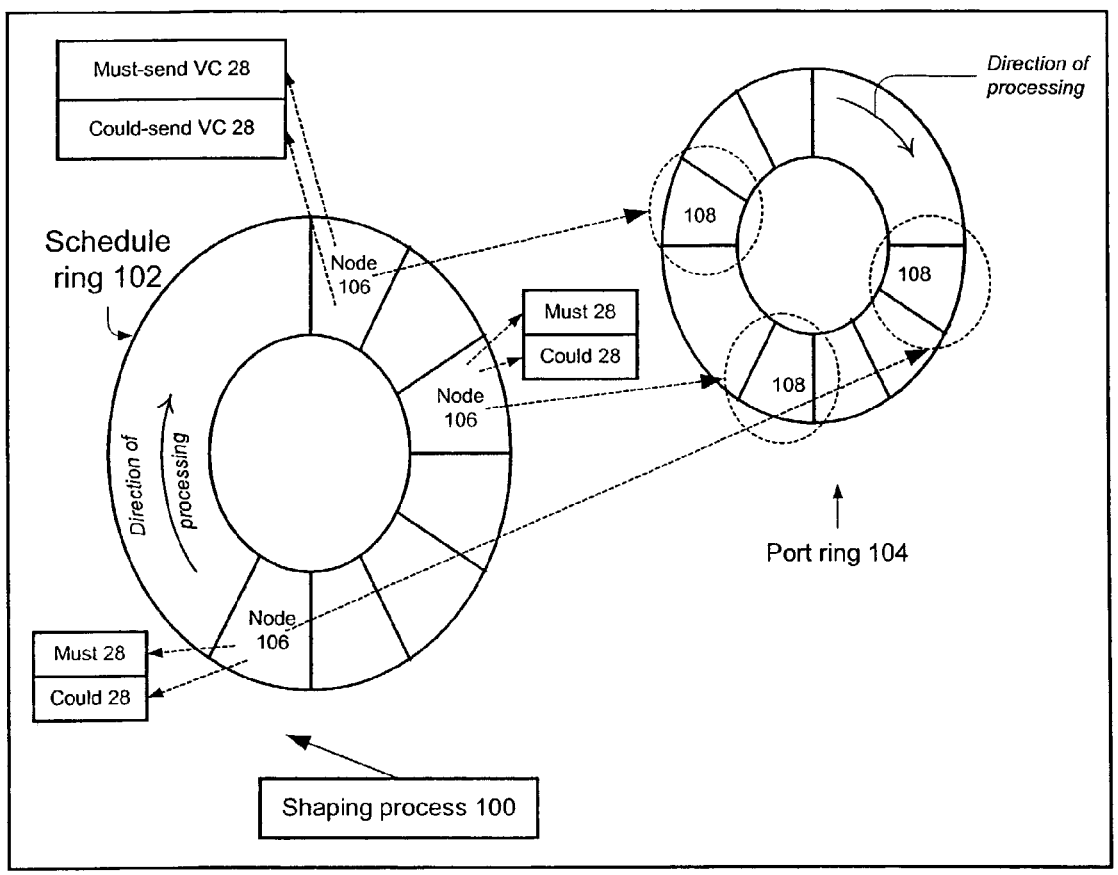
FIG. 10 illustrates a schedule ring and port rings.

Referring to FIG. 10, a shaping process 100 operates on a schedule ring 102 and a port ring 104. Shaping process 100 is encoded as computing instructions to be performed by a transmit processor 16c (shown in FIG. 1) in router/traffic shaper 12. Schedule ring 102 and port ring 104 are data structures that encode a schedule of transmission opportunities for data in virtual connections 28 processed by router/traffic shaper 12. Receive processors 16b place such data in VC connection queues 56 (shown in FIG. 4) to await dequeuing and transmission by shaping process 100. Shaping process 100 iterates over schedule ring 102 once per transmission cycle. Broadly speaking, shaping process 100 uses the schedule encoded in schedule ring 102 to satisfy contracted data rates for virtual connections 28, while also using port ring 104 and other data structures to provide rate control for virtual ports 26.

Schedule ring 102 and port ring 104 are shown in FIG. 10 as circular structures to indicate their conceptual ring structure, i.e., iterations begun at the head or base of each ring will typically proceed to the end and then wrap around to the head when the previous iteration is complete. Schedule ring 102 and port ring 104 are each stored in memory 40 as an array. Schedule ring 102 has a base 103 at which ring 102 begins in memory 40. Similarly, port ring 104 has a base 105.

Schedule ring 102 includes a sequence of schedule nodes 106. Port ring 104 includes a sequence of port nodes 108.

Categorization of Service Rates

Figure 11:
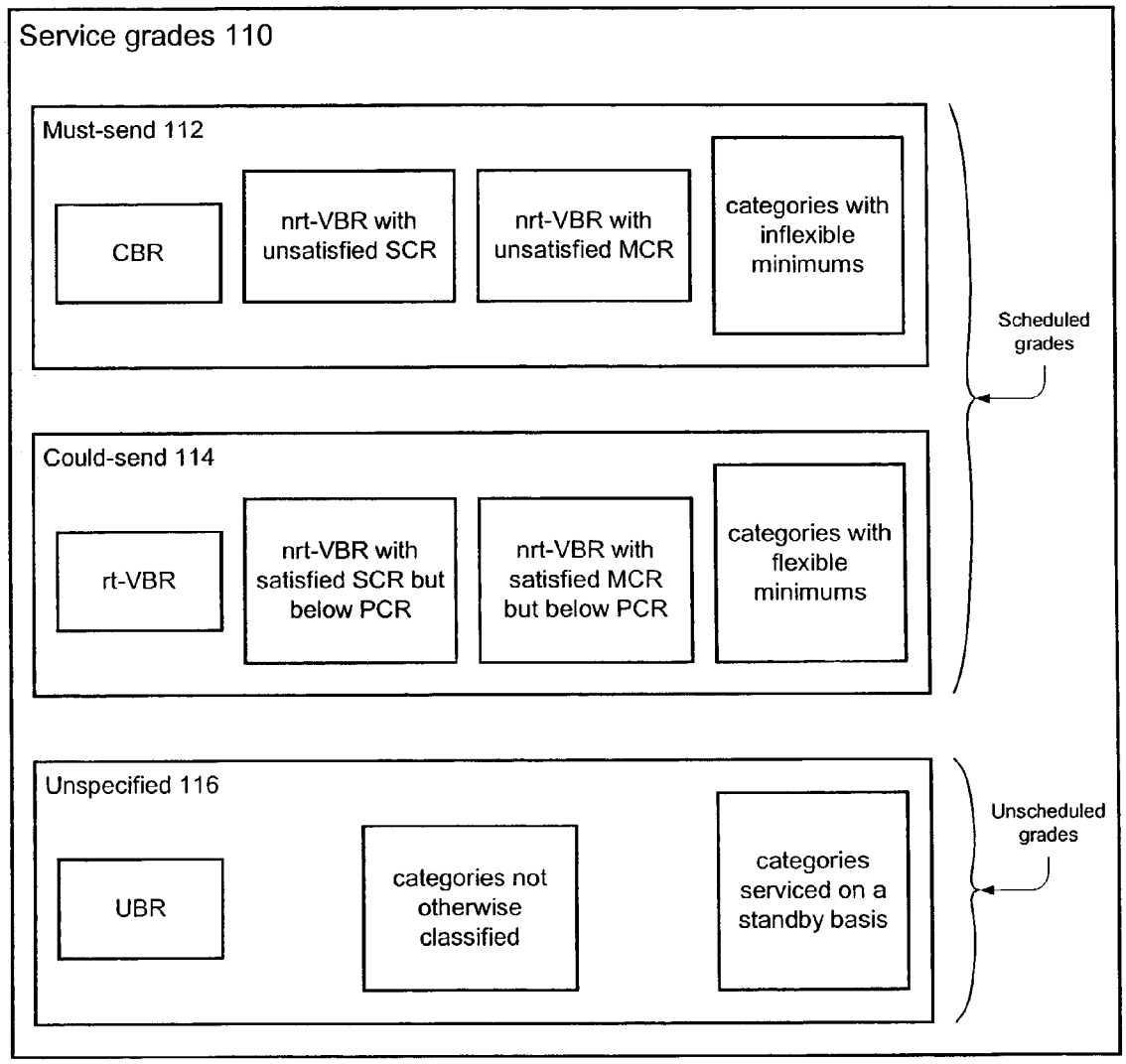
FIG. 11 is a block diagram of service grades.

ATM Forum defines service categories such as CBR and VBR for virtual connections 28 that use the ATM network protocol. Referring to FIG. 11, shaping process 100 defines service grades 110 over these categories, such that service grades 110 partition all service categories that shaping process 100 handles. Shaping process 100 handles all service categories within a service grade similarly. In other words, the service grades 110 represent functional groups within shaping process 100. Every virtual connection 28 handled by shaping process 100 is associated with a service grade 110.

Shaping process 100 includes service grades 110 for must-send 112, could-send 114, and unspecified 116. Must-send 112 includes CBR, nrt-VBR with unsatisfied SCR, and nrt-VBR with unsatisfied MCR. In general, must-send 112 includes service categories for contracts that have inflexible minimum data rates. Could-send 114 includes rt-VBR, nrt-VBR with satisfied SCR but below PCR, and nrt-VBR with satisfied MCR but below PCR. In general, could-send 114 includes service categories for contracts that have flexible minimum data rates. Unspecified 116 includes UBR virtual connections 28 that have various priority categories. Unspecified 116 is also the default service grade 110 for any virtual connection 28 which shaping process 100 has not affiliated with a service grade 110, or which is not scheduled for regular service by shaping process 100.

Must-send 112 and could-send 114 are "scheduled" service grades 110, based on the fact that schedule rings 102 have explicit references that can affiliate a transmission opportunity with a reference to a must-send 112 virtual connection 28, or a reference to a could-send 114 virtual connection 28, or both (as shown in FIG. 10). Unspecified 116 is an "unscheduled" service grade 110. In general, unspecified 116 includes all categories that shaping process 100 services on a standby basis relative to scheduled service grades 110.

Shaping process 100 can vary the classification of a virtual connection 28 dynamically based on a property of the virtual connection 28. For instance, shaping process 100 classifies an nrt-VBR virtual connection 28 that has an MCR and a PCR, but which during the current transmission cycle has not been serviced up to its MCR, as must-send 112. However, once this virtual connection 28 has been serviced to its MCR but below its PCR, shaping process 100 reclassifies it as could-send 114 for the remainder of the transmission cycle.

In general, shaping process 100 prioritizes could-send 114 below must-send 112 but above unspecified 116.

Schedule Ring

Figure 12:
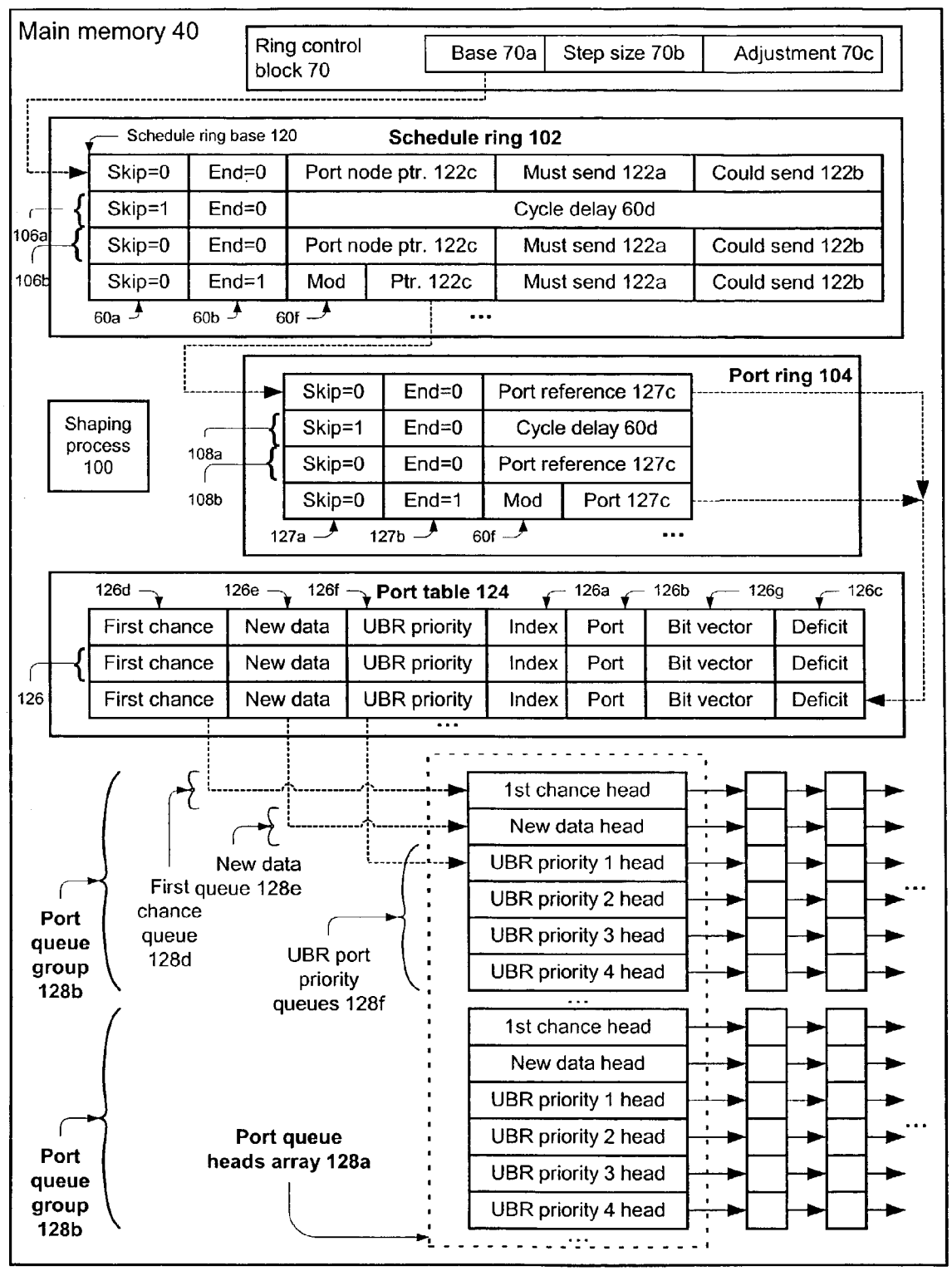
FIG. 12 is a block diagram of schedule and port ring data structures.

Referring to FIG. 12, schedule ring 102 is a data structure in main memory 40 containing a sequence of schedule nodes 106. The sequence of schedule nodes 106 indicates the schedule for transmission. Each schedule node 106 represents either a transmission opportunity on a transmit processor 16*c* (shown in FIG. 1) or a timing control feature, as will be explained. When a schedule node 106 represents a transmission opportunity, it references at least one scheduled virtual connection 28. The allocation of nodes 106 to virtual connections 28, where the allocation includes both the total nodes 106 assigned to each scheduled virtual connection 28 and the relative position of such schedule nodes 106 within schedule ring 102, provides a schedule for regular service to virtual connections 28.

Schedule ring 102 includes a schedule ring base 103, which denotes the beginning of the schedule ring 102 in main memory 40. Schedule rings 102 have a predetermined number of schedule nodes 106 (namely 65,536, or $2^{16}$). This means that a sixteen-bit reference is sufficient to index the schedule nodes 106 such that the nodes can be addressed individually.

A base address 70*a* in ring control block 70 references schedule ring base 103. Step size 70*b* contains the number of processor cycles available to each transmission opportunity, i.e., to each schedule node 106. Step size 70*b* is therefore related to the shaping granularity of the service that shaping process 100 can provide.

Step size 70*b* depends in part on the number of distinct schedule rings 102 defined within router/traffic shaper 12. Router/traffic shaper 12 is configured to manage traffic for a collection of virtual ports 26. In one typical configuration, the collection of virtual ports 26 corresponds to the physical ports 24*a* (shown in FIG. 2) of router/traffic shaper 12, plus perhaps additional ports on remote network devices. In order to maximize aggregate throughput to the collection of virtual ports 26, therefore, router/traffic shaper 12 is prepared to support the aggregate of the maximum sustained data rates for the collection of virtual ports 26. To take a simple example, suppose that the collection of virtual ports 26 corresponds only to the physical ports 24*a* of router/traffic shaper 12 and that the aggregate throughput goal of router/traffic shaper 12 is a fixed OC-12 rate to the DSL side. In that case, one option is to configure one schedule ring 102 to provide all service at the OC-12 rate. This one schedule ring 102 would provide shaping granularity of 9492 bps (which is 622.08 Mbps divided by the number of time slots). Another option is to configure router/traffic shaper 12 with multiple schedule rings 102 dividing up the workload and achieving finer transmit granularity, i.e., smaller step rates 70*b*. Two OC-6 schedule rings 102 provide granularity of 4746 bps, and so forth. Similarly, multiple shaping processes 100 iterating over the same schedule ring 102 are another way to divide the workload and achieve finer transmit granularity.

The schedule/port embodiment often requires less space in main memory 40 for its rings than the major/minor embodiment does. In particular, two factors—the number of specified-rate virtual connections 28 and the number of virtual ports 26 —drive up memory requirements for the major/minor embodiment requires faster than for the schedule/port embodiment. For example, suppose that for small virtual ports 26, roughly one kilobyte of memory is needed, and that router/traffic shaper 12 handles roughly two thousand virtual ports 26. Then roughly two megabytes of memory (one kilobyte times two thousand) is necessary for the minor ring 22 entries alone. (The number of specified-rate virtual connections 28 does not affect port rings 104.) In contrast, the 65,536 entries in schedule ring 102 would require less than two megabytes, since entries in schedule ring 102 contain fewer than 32 bytes.

Schedule Node

Referring still to FIG. 12, there are at least two types of node 106: a skip node 106*a* used for timing control, and a schedule node 106*b* that represents a transmission opportunity.

Schedule node 106*b* includes fields for must send 122*a*, which references a virtual connection 28 that is must-send 112, and could send 122*b*, which references a virtual connection 28 that is could-send 114. When no virtual connection 28 is associated with must send 122*a* or could send 122*b*, the corresponding field contains a null pointer. A given virtual connection 28 can be referenced by more than one schedule node 106 in the same schedule ring 102.

Schedule node 106*b* also contains a port node pointer 122*c*, which references a location in port ring 104.

Nodes 106 also have fields for skip flag 60a, end flag 60b, and modify 60f, whose functions have been described in the major/minor embodiment.

Skip nodes 106a have skip flag 60a set. Instead of fields must send 122a, could send 122b, and port node pointer 122c, skip nodes 106a have a field for cycle delay 60d. In contrast, schedule nodes 106b have skip flag 60a not set and do not have a field for cycle delay 60d.

When multiple schedule rings 102 are used simultaneously, each schedule ring 102 can have its own step rate 70b. In this way, schedule rings 102 can be allocated varying percentages of the total bandwidth managed by router/shaper 12. Skip nodes 106a or other timing control mechanisms, as will be explained, can account for time not used by a given schedule ring 102.

Port Table, Port Entries, and Port Queues

Referring still to FIG. 12, port table 124 is a data structure residing in main memory 40 containing port entries 126. Each port entry 126 corresponds to a virtual port 26. In general, port entry 126 contains information describing the current state of its affiliated virtual port 26, including references to queues for virtual port 26 that store data awaiting transmission by shaping process 100.

Port entry 126 includes port table index 126a. Shaping process 100 typically has random-access interactions with port entries 126 using port table index 126a. Port table index 126a holds a key value that uniquely identifies each port entry 126 in port table 124.

Port entry 126 also includes virtual port reference 126b, deficit counter 126c, first chance queue reference 126d, new data queue reference 126e, UBR priority queue reference 126f, and bit vector 126g. Virtual port reference 126b affiliates port entry 126 with master information maintained by ring leader processor 16a, including performance parameters for the associated virtual port 26. Specifically, virtual port reference 126b contains a value that references a V-port node 97 (shown, for instance, in FIG. 9) by corresponding to its v-port index pointer 97a.

Deficit counter 126c supports port flow control. Deficit counter 126c stores the weight for associated virtual port 26 in shaping process 100's weighted round-robin allocation of transmission opportunities. Deficit counter 126c contains unsigned integer values. At the beginning of every transmission cycle, deficit counter 126c is re-initialized to a weight that reflects the maximum number of times associated virtual port 26 should be serviced. For instance, for ATM cells 36 that have constant payload size, the weight can be the number of packets in a single transmission cycle permissible at the maximum data rate of associated virtual port 26. Whenever data is transmitted on associated virtual port 26, shaping process 100 decrements deficit counter 126c by a number appropriate to the amount of data transmitted. When the weight is based on packet counts, the decrement interval is simply one per transmitted packet.

First chance queue reference 126d, new data queue reference 126e, and UBR priority queue reference 126f contain values that specify positions in a port queue heads array 128a. Port queue heads array 128a contains the heads of queues that store data awaiting transmission by shaping process 100, where the data is affiliated with a virtual port 26. In general, such data includes data for unscheduled virtual connections 28, as well as data from scheduled virtual connections 28 which has been dynamically rescheduled by shaping process 100, for instance after having been given a scheduled transmission opportunity that could not be serviced due to port blockage or lack of data.

Typically, port queue heads array 128a is stored as a contiguous block of main memory 40, sequenced such that simple offsets into port queue heads array 128a are possible. Also, all queues affiliated with a given port entry 126 are stored in contiguous blocks. Each queue associated with port queue heads array 128a is stored as a linked list, so each entry of port queue heads array 128a contains a pointer to the next node in its respective queue.

A port queue group 128b is the collection of such queues for a given port entry 126. For each port queue group 128b, there exists a first chance queue 128d, a new data queue 128e, and a collection of UBR port priority queues 128f. As illustrated in FIG. 12 by directed dotted lines, for a given virtual port 26, first chance queue reference 126d specifies first chance queue 128d, new data queue reference 126e specifies new data queue 128e, and UBR priority queue reference 126f specifies the first of the collection of UBR port priority queues 128f. When port queue heads array 128a is stored as a contiguous block of main memory 40, subsequent members of the collection of UBR port priority queues 128f can be reached by simply offsetting a distance in main memory 40 from the first of the collection of UBR port priority queues 128f, where the distance is proportional to the member's position in the collection. Typically, the collection of UBR port priority queues 128f is ordered from highest-priority to lowest.

Bit vector 126g provides a quick way to detect whether a queue in the port queue group 128b contains data. Bit vector 126g is an ordered list of bits including one bit for every queue in the port queue group 128b. The order corresponds to each queue's position in the port queue group 128b's representation in port queue heads array 128a. Thus, the first bit in bit vector 126g corresponds to first chance queue 128d, the second bit corresponds to new data queue 128e, and subsequent bits correspond to UBR port priority queues 128f. When a bit in bit vector 126g is on, it indicates that the corresponding queue in the port queue group 128b contains data. A bit in bit vector 126g is therefore an emptiness indicator for its corresponding queue.

First chance queue 128d stores references to virtual connections 28, in FIFO order. First chance queue 128d is used for traffic to be transmitted to virtual port 26 at the first opportunity.

New data queue 128e stores references to virtual connections 28, in FIFO order. If a scheduled virtual connection 28 (such as referenced by must send 122a or could send 122b) has no data, the transmit thread will flag this at the corresponding entry in VC table 50. When data arrives, receive processor 16b will either discard according to soft or strict traffic management policing, or enqueue the data for virtual connection 28 and also place the VC index 52a on new data queue 128e. New data queue 128e is behind first chance queue 128d in priority and ahead of UBR port priority queue 128f.

UBR port priority queue 128f stores references to virtual connections 28, in FIFO order. Virtual port 26 has a set of four prioritized class of service queues for UBR virtual connections 28 in this embodiment.

Port Ring

Broadly speaking, port ring 104 schedules the allocation of transmission opportunities to virtual ports 26. This allocation provides one form of rate control, in that the throughput of a given virtual port 26 is constrained by the number of transmission opportunities it receives.

Referring to FIG. 12, port ring 104 is a data structure residing in main memory 40 containing a sequence of port nodes 108b and 108a. Port node 108b includes port reference 127c referencing a port entry 126, which corresponds to a virtual port 26. Port nodes 108a includes cycle delay 60d for timing control. The allocation of port nodes 108b to virtual ports 26, where the allocation includes the total port nodes 108b assigned to each scheduled virtual port 26 as well as the relative position of such port nodes 108b within port ring 104, provides a rubric for service to virtual ports 26. Unlike the schedule to virtual connections 28 encoded in schedule ring 102, the rubric for service to virtual ports 26 is not guaranteed and depends instead on transmission opportunities being available after shaping process 100 has attended to scheduled virtual connections 28. The rubric for service to virtual ports 26 provides a degree of fairness and control over unscheduled virtual connections 28.

Port node 108 includes skip flag 127a, end flag 127b, and modified bit 60f.

Port nodes 108a have skip flag 60a set. Instead of a port reference 127c field, port nodes 108a have a field for cycle delay 60d. In contrast, port nodes 108b have skip flag 60a not set and do not have a field for cycle delay 60d.

End flag 127b has the same role and same functions within port ring 104 that end flag 60b has within major ring 20, as described in the major/minor embodiment.

Shaping Process

Shaping process 100 is a method that selects data for transmission by router/traffic shaper 12. Shaping process 100 selects data from a variety of queues, including queues for scheduled virtual connections 28, queues for unscheduled virtual connections 28, and first chance queues 128d and new data queues 128e. Shaping process 100 selects virtual connections 28 for transmission, subject to service rates. Shaping process 100 also provides port flow control.

Figure 13:
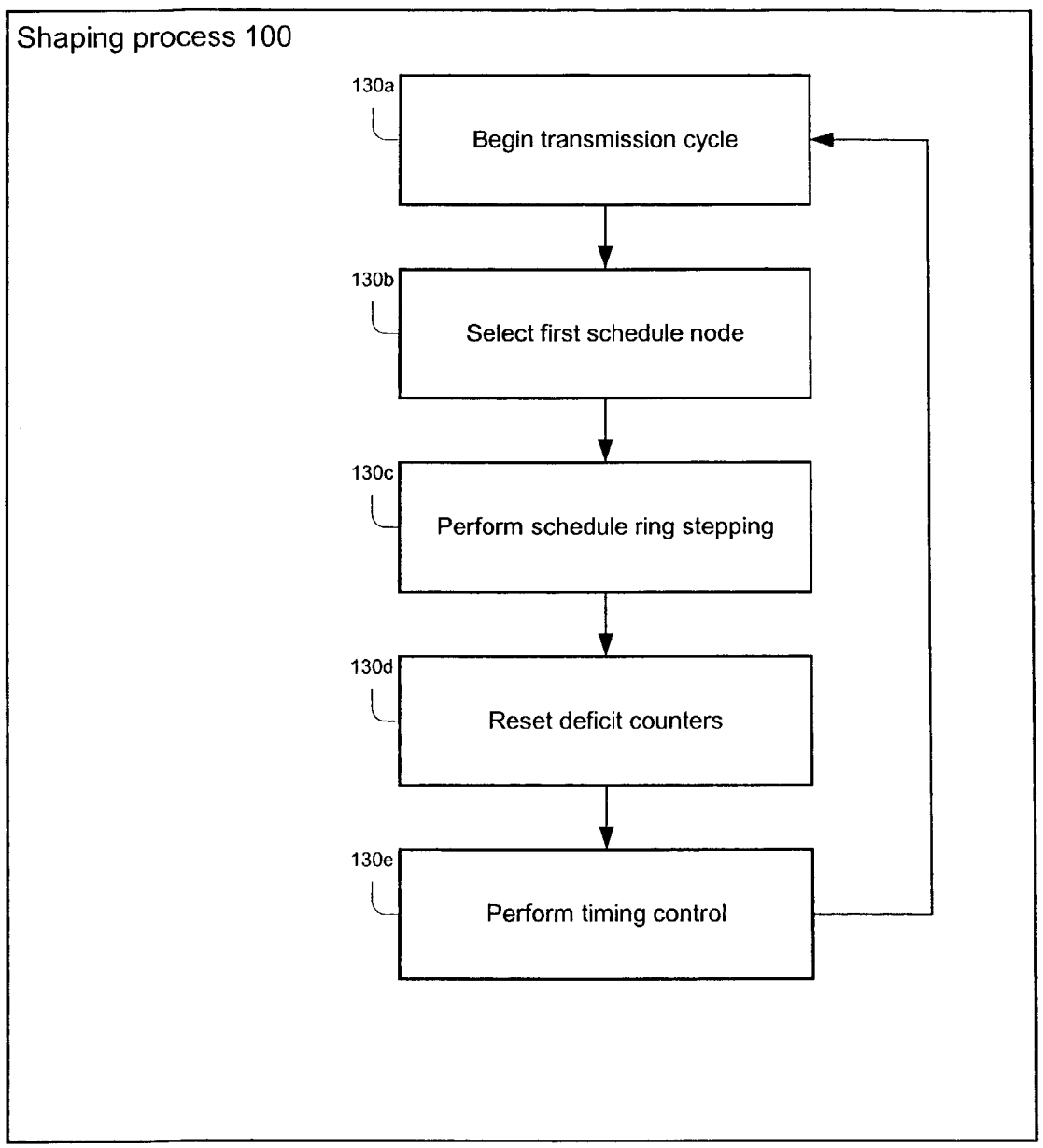
FIG. 13 is a flowchart of a shaping process.

Referring to FIG. 13, shaping process 100 works as follows. Shaping process 100 starts at the beginning of a transmission cycle (procedure 130a). Next, shaping process 100 selects the schedule node 106 at the beginning of schedule ring 102 as the current schedule node 106 (procedure 130b). Specifically, shaping process 100 uses base address 70a from ring control block 70 (shown in FIG. 12) to determine the first schedule node 106 in schedule ring 102. Shaping process 100 then uses schedule ring stepping process 132 (shown in FIG. 14) to select successive schedule nodes 106 and to select data for transmission (procedure 130c), subject to performance parameters of virtual connections 28, to rate control on virtual ports 26, and to timing control encoded into schedule ring 102 and port ring 104. After schedule ring stepping process 132 terminates, shaping process 100 resets deficit counters 126c used in weighted round-robin rate control on virtual ports 26 (procedure 130d). Next, shaping process 100 enters a wait state of length determined by the value of adjustment 70c (shown in FIG. 12) and, optionally, performs timing control such as recalculating adjustment 70c for the next iteration (procedure 130e). Shaping process 100 then begins the next transmission cycle anew (at procedure 130a).

Each schedule node 106 represents either cycle delay or a transmission opportunity. When the current schedule node 106 represents a transmission opportunity, schedule ring stepping process 132 first tries to transmit to a scheduled virtual connection 28 referenced by a current schedule node 106b (shown in FIG. 12). If a scheduled virtual connection 28 is not available for transmission, schedule ring stepping process 132 invokes a port ring stepping process 134. Port ring stepping process 134 tries to service virtual ports 26 for the duration of the current transmission opportunity, beginning with a virtual port 26 referenced by schedule node 106b.

Shaping process 100 performs the following actions for each transmission cycle. At the beginning of the transmission cycle, shaping process 100 uses base address 70a from ring control block 70 (shown in FIG. 12) to determine the first schedule node 106 in schedule ring 102, making this schedule node 106 the current schedule node 106. Shaping process 100 then invokes schedule ring stepping process 132. After this instance of schedule ring stepping process 132 concludes, shaping process 100 performs timing control.

For virtual connections 28 that are not UBR and have sufficient data in VC connection queues 56 awaiting transmission, shaping process 100 aims to satisfy the contracted rates of the virtual connections 28, subject to network conditions such as the performance of virtual ports 26 and network 30. For UBR virtual connections 28 that have sufficient data in VC connection queues 56 awaiting transmission, shaping process 100 aims to service the UBR virtual connections 28 as available bandwidth allows. Bandwidth is available, for example, when virtual connections 28 with contracted rates encounter network blockages or do not have enough data queued in VC connection queues 56 to fully occupy their allocated rates.

Schedule Ring Stepping Process

Figure 14:
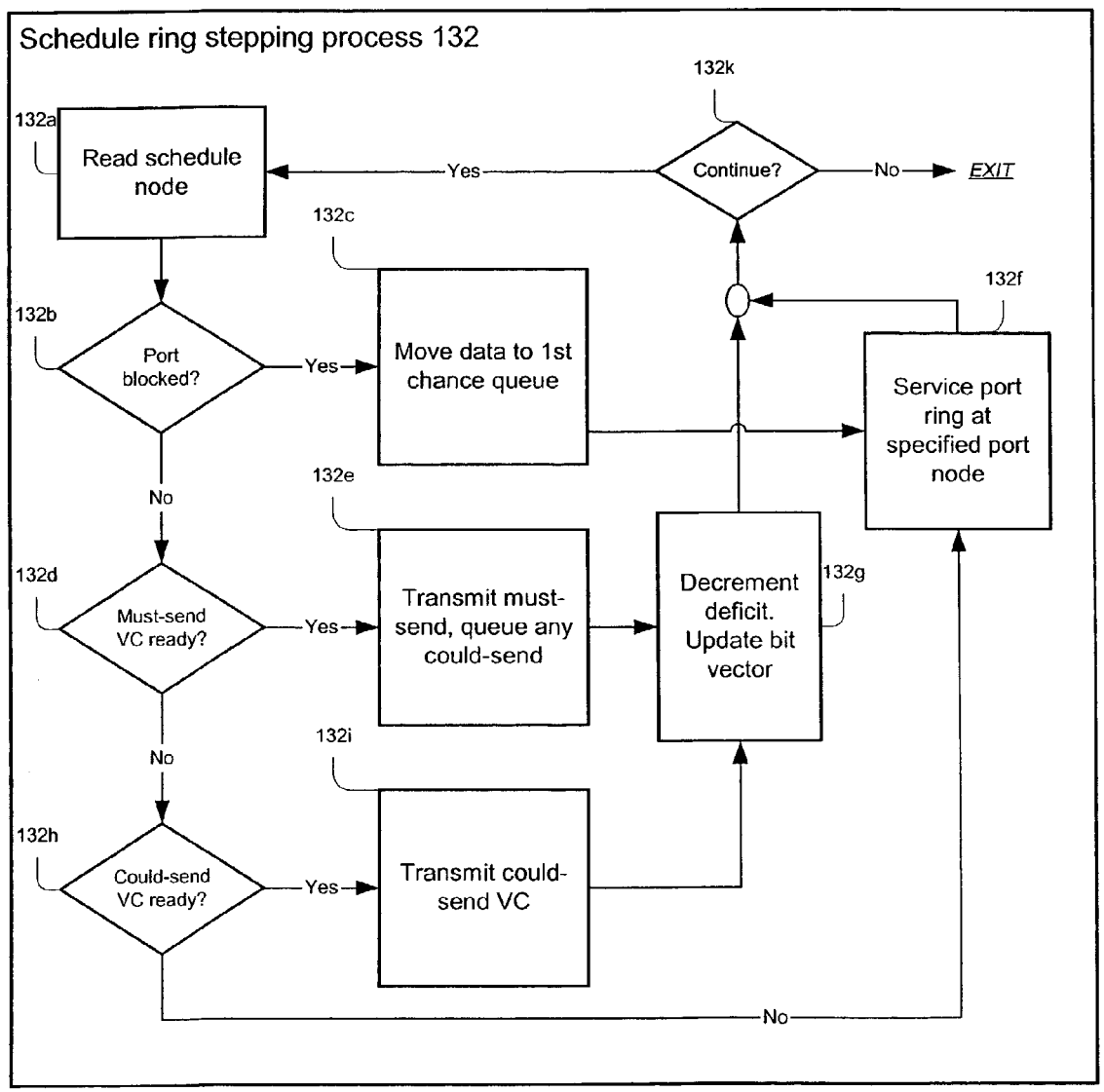
FIG. 14 is a flowchart of a schedule ring stepping process.

Referring to FIG. 14, schedule ring stepping process 132 is a procedure that iterates over schedule nodes 106 of a schedule ring 102.

First, schedule ring stepping process 132 initiates a window counter to track the duration of the current transmission opportunity. The window counter is initiated to the step size 70b (shown in FIG. 12) of schedule ring 102. Schedule ring stepping process 132 reads the current schedule node 106. If the current schedule node 106 is a skip node, i.e., has skip flag 60a set, then schedule ring stepping process 132 waits a number of processor cycles given by the step size 70b of schedule ring 102, then makes the next schedule node 106 in schedule ring 102 the current schedule node 106. Schedule ring stepping process 132 repeats this until either reaching the end of schedule ring 102 or finding a current schedule node 106 that is not a skip node (procedure 132a).

Next, current schedule node 106 has a scheduled virtual connection 28. Schedule ring stepping process 132 tests whether the virtual port 26 associated with scheduled virtual connection 28 is blocked (procedure 132b). For instance, associated virtual port 26 may be blocked by network flow control.

If the virtual port 23 is blocked and scheduled virtual connection 28 has data awaiting transmission, schedule ring stepping process 132 reschedules the data to the first chance queue 128d for associated virtual port 26 (procedure 132c). In particular, schedule ring stepping process 132 determines whether scheduled virtual connection 28 has data by consulting VB table 50 (shown in FIG. 4) and examining the corresponding bit in VC bit vector 54. If the bit is set, scheduled virtual connection 28 has data. In other words, the bit is an emptiness indicator for scheduled virtual connection 28. Schedule ring stepping process 132 dequeues the data from the front of corresponding VC connection queue 56 and enqueues it at the back of the first chance queue 128d for associated virtual port 26.

Next, schedule ring stepping process 132 services port ring 104 at port node 108 specified by current schedule node 106 (procedure 132f). In particular, schedule ring stepping process 132 reads port node pointer 122c to determine a port node 108 on which to use port ring stepping process 134 (shown in FIG. 15). After servicing port ring 104 for the duration of the current transmission opportunity, port ring stepping process 134 returns control to schedule ring stepping process 132.

Next, schedule ring stepping process 132 evaluates whether to continue iterating over schedule nodes 106 (procedure 132k). If the result is positive, schedule ring stepping process 132 loops back to procedure 132a to read the next schedule node 106. If the result is negative, schedule ring stepping process 132 terminates.

If virtual port 23 was not found to be blocked (in procedure 132b), schedule ring stepping process 132 tests whether the scheduled virtual connection 28 referenced by the must-send 122a field of current schedule node 106 is ready to transmit (procedure 132d). Readiness of a virtual connection 28 is indicated by having data on corresponding VC queue 56 and having values for current burst count 52g and current rate 52h that are within the bounds set by MBS 52c and rate 135 (shown in FIG. 4).

If the must-send 122a virtual connection 28 is ready, schedule ring stepping process 132 transmits data from the corresponding VC queue 56 (procedure 132e). Specifically, schedule ring stepping process 132 transmits as much data as possible, subject to the amount of processing that can be done in the current transmission opportunity (indicated by the window counter), and subject to the MBS and PCR of the virtual connection 28. Also, if the could-send 837 virtual connection 28 is also ready, schedule ring stepping process 132 reschedules data from the could-send 837 virtual connection 28 to the end of the first chance queue 128d for its associated virtual port 26.

Next, schedule ring stepping process 132 updates states of various data structures to reflect the transmission of data (procedure 132g). Specifically, schedule ring stepping process 132 decrements deficit counter 126c corresponding to the virtual port 26 that transmitted the data. Schedule ring stepping process 132 also checks whether VC queue 56 is now empty of data, and if so, updates the corresponding bit in VC bit vector 54.

Next, schedule ring stepping process 132 checks whether to continue (procedure 132k, described above) and proceeds from there.

If the must-send 122a virtual connection 28 was not ready (in procedure 132d), schedule ring stepping process 132 tests whether the scheduled virtual connection 28 referenced by the could-send 837 field of current schedule node 106 is ready to transmit (procedure 132h).

If the could-send 837 virtual connection 28 is ready, schedule ring stepping process 132 transmits data from the corresponding VC queue 56 (procedure 132i). Specifically, schedule ring stepping process 132 transmits as much data as possible, subject to the amount of processing that can be done in the current transmission opportunity (indicated by the window counter), and subject to the MBS and PCR of the virtual connection 28.

Next, schedule ring stepping process 132 updates data structures (procedure 132g, described above) and proceeds from there.

If the could-send 837 virtual connection 28 was not ready (in procedure 132h), schedule ring stepping process 132 services port ring 104 (procedure 132f, described above) and proceeds from there.

In general, schedule ring stepping process 132 returns repeatedly to process the next schedule node 106 (beginning in procedure 132a) or terminates (after exiting procedure 132k).

Port Ring Stepping Process

Figure 15:
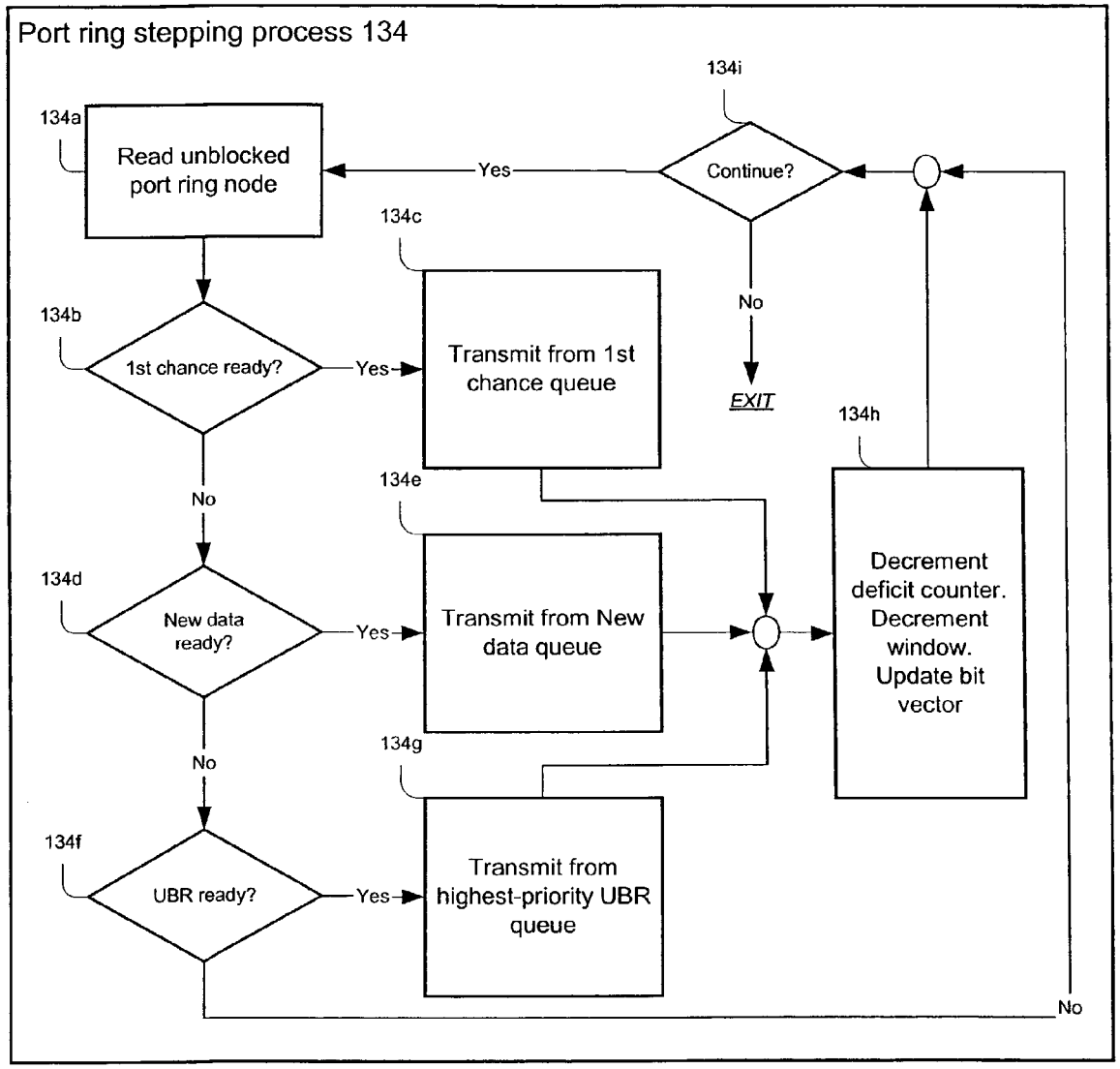
FIG. 15 is a flowchart of a port ring stepping process.

Referring to FIG. 15, port ring stepping process 134 is a procedure that iterates over at least a portion of port ring 104, given a starting port node 108 and a window counter that describes a current transmission opportunity. In other words, and in general, port ring stepping process 134 services port ring 104 for a specified finite period of time, starting from a given position within port ring 104.

Port ring stepping process 134 monitors the processor cycles that it uses, so as not to exceed the current transmission opportunity. If at any point port ring stepping process 134 reaches the end of the current transmission opportunity, port ring stepping process 134 terminates and returns control to the process that invoked it.

The shaping process 100 is port work conserving in its iteration of the port ring 104.

First, port ring stepping process 134 reads an unblocked port ring node 108 (procedure 134a). Specifically, port ring stepping process 134 begins with a current port ring node 108, which when port ring stepping process 134 is first invoked, is specified as a parameter. If the current port ring node 108 has a set skip flag 127a, port ring stepping process 134 enters a wait state for timing control. If the current port ring node 108 has a port reference 127c, port ring stepping process 134 verifies that the associated virtual port 26 is not blocked. If the virtual port 26 is blocked, port ring stepping process 134 advances to the next port ring node 108 and begins testing again until either finding a non-blocked virtual port 26 or reaching the end of the current transmission opportunity.

Next, having found a current port ring node 108 with a non-blocked virtual port 26, port ring stepping process 134 tests whether the corresponding first chance queue 128d is ready to transmit (procedure 134b). Readiness of a queue in a port queue group 128b (shown in FIG. 12) requires data on the queue. Additionally, for the virtual connection 28 associated with the first packet of data on the queue and the corresponding VC entry 52 (shown in FIG. 4), readiness requires values for current burst count 52g and current rate 52h that are within the bounds set by MBS 52c and rate 52d.

If first chance queue 128d is ready, port ring stepping process 134 transmits data from that queue (procedure 134c). Specifically, port ring stepping process 134 transmits as much data as possible, subject to the amount of processing that can be done in the current transmission opportunity, and subject to the MBS and PCR of the virtual connection 28 associated with the data.

Next, port ring stepping process 134 updates states of various data structures to reflect the transmission of data (procedure 134h). Specifically, schedule ring stepping process 132 decrements deficit counter 126c corresponding to the virtual port 26 that transmitted the data. Schedule ring stepping process 132 also checks whether any queue in port queue group 128b is now empty of data, among those that received transmitted data in the current invocation of schedule ring stepping process 132. If so, schedule ring stepping process 132 updates the corresponding bit in port bit vector 126g (shown in FIG. 12).

Next, port ring stepping process 134 evaluates whether to continue iterating over port nodes 108 (procedure 134i). If the result is positive, port ring stepping process 134 proceeds to procedure 132a to find the next non-blocked port node 108. If the result is negative, port ring stepping process 134 terminates.

If first chance queue 128d was not ready (in procedure 134b), port ring stepping process 134 tests whether the new data queue 128e associated with current port node 108 is ready to transmit (procedure 134d).

If new data queue 128e is ready, port ring stepping process 134 transmits data from that queue (procedure 134e). Specifically, port ring stepping process 134 transmits as much data as possible, subject to the amount of processing that can be done in the current transmission opportunity, and subject to the MBS and PCR of the virtual connection 28 associated with the data.

Next, port ring stepping process 134 updates states of various data structures to reflect the transmission of data (procedure 134h, described above) and proceeds from there.

If new data queue 128e was not ready (in procedure 134d), port ring stepping process 134 tests whether any UBR port priority queue 128f associated with the virtual port 26 for current port node 108 is ready to transmit (procedure 134f).

If there is a UBR port priority queue 128f ready, port ring stepping process 134 selects the queue with the highest priority from among the ready UBR port priority queues 128f, and transmits data from that queue (procedure 134g). If the duration of the current transmission opportunity permits, and if port ring stepping process 134 exhausts all available data from a first such UBR port priority queue 128f, port ring stepping process 134 transmits additional data from a next ready UBR port priority queue 128f, in descending order of priority, until it, too, is emptied. This process continues until all such data is transmitted or the current transmission opportunity expires.

Next, port ring stepping process 134 updates states of various data structures to reflect the transmission of data (procedure 134h, described above) and proceeds from there.

If no UBR port priority queue 128f was ready (in procedure 134f), port ring stepping process 134 evaluates whether to continue iterating over port nodes 108 (procedure 134i, described above) and proceeds from there.

In general, port ring stepping process 134 repeatedly processes the next port node 106 (beginning in procedure 134a) or terminates (after exiting procedure 134i, or after the current transmission opportunity expires).

Requeueing

In certain situations, shaping process 100 will move enqueued data from one queue to another in response to virtual connection 28 states and their contracted rates. In particular, VBR virtual connections 28 having both a MCR and a PCR can sometimes have an inflexible demand for service (such as when the MCR is not satisfied), while at other times their demand for service is flexible (such as when the MCR is satisfied but the PCR has not been reached). Shaping process 100 moves such VBR virtual connections 28 between service grades 110 for must-send 112 and for could-send 114 (shown in FIG. 11) by moving associated data from must send queue 122a to could send queue 122b (shown in FIG. 12).

For a realtime VBR (rt-VBR) virtual connection 28 operating at peak cell rate, shaping process 100 assigns virtual connection 28 to could-send status. If there is no constant bit rate (CBR) conflict, virtual connection 28 will send at peak cell rate for a number of transmits constrained only by maximum burst size (MBS). If there is still un-transmitted data after these transmits, virtual connection 28 will back off to below peak cell rate. If there is no data, shaping process 100 will flag the associated bit in VC connection queue vector 828. This flag suspends scheduling for virtual connection 28 until receive processor 16b places data for it on new data queue 128e.

For a non-realtime VBR (nrt-VBR) virtual connection 28, shaping process 100 calculates a minimum cell rate based on sustained cell rate and assigns virtual connection 28 to must-send status for the length of a MBS transmission. Shaping process 100 then assigns virtual connection 28 to could-send status for a MBS transmission.

Shaping process 100 will re-queue CBR virtual connections 28 at peak cell rate, as must send virtual connections 28.

Alternate Embodiments

A number of embodiments have been described. Nevertheless, it will be understood that various modifications may be made without departing from the spirit and scope of the description. For example, a single processor 16 can serve multiple processor purposes, for instance by running more than one thread. Multiple shaping processes 100 may operate concurrently on a given transmit processor 16c, and multiple transmit processors 16c may concurrently perform instances of shaping process 100 within a given router/traffic shaper 12.

Schedule ring base 103 denotes both the beginning of the schedule ring 102 in main memory 40 and the beginning from which shaping process 100 begins its traversal of schedule ring 102. In alternate embodiments, shaping process 100 could begin its traversal of schedule ring 102 from another point, iterate over the nodes 106 until reaching the end of schedule ring 102, wrap to the beginning, and continue iterating over the nodes 106 until achieving a complete traversal.

The number of nodes 106 in schedule ring 102 is 65,536, which conveniently allows an integer index schedule ring 102 to be represented in exactly sixteen bits, but other numbers are possible.

The described embodiments specify support for a total of up to forty major rings 20, but the approach can be extended to support more than forty.

Schedule ring 102 and port ring 104 are described as residing in main memory 40. An advantage of putting these data structures main memory 40 is that it provides rapid access to data and also allows software updates. Alternatively, all or portions of schedule ring 102 and port ring 104 could reside in other storage, including high-speed or cache memory or non-volatile storage such as a disk drive.

Each shaping process 100 can have its own instance of a schedule ring 102. Alternatively, multiple shaping processes 100 can share a single schedule ring 102. In the latter case, it is likely that problems could arise if multiple shaping processes 100 are allowed to service the same schedule node 106 at the same time—for instance, contention at the VC connection queues 56. Thus, additional measures for contention resolution may be necessary, but such measures would be familiar to one skilled in the art.

The balancing rules cited in Table 1 are just an example of a balancing policy. Other policies are possible.

In general, a router/traffic shaper manages traffic for a collection of virtual connections. Each such virtual connection is either UBR or has a service contract, such as CBR or VBR. The router/traffic shaper includes receive processors that accept incoming data from the virtual connections and process the data into a collection of queues. The router/traffic shaper also includes transmit processors that perform a traffic shaping process. The traffic shaping process transmits data from the queues onto a network, to the satisfaction of the service contracts and QOS considerations among the collection of virtual connections.

The traffic shaping process uses data structures that encode a traffic schedule (or simply "schedule"). A schedule organizes transmission opportunities for virtual connection data enqueued by receive processors. A transmission opportunity is a time slot. It can be measured in processor cycles of transmit processors or as a "shaping granularity" of bandwidth, such as in bits per second. For each virtual connection with a contracted rate, the schedule allocates sufficient opportunities to satisfy the contract, i.e., guarantee a level of service.

A traffic shaping process uses the schedule (encoded among data structures) to select the data that is transmitted by the router/traffic shaper. The schedule provides a basis for such selections, but actual transmission choices are subject to operating conditions such as port blockage and under-utilization of bandwidth. For instance, a given virtual connection with a contracted rate might have periods during which no data is being transmitted. The traffic shaping process can give the unused bandwidth to other virtual connections, such as UBR virtual connections, of lesser priority, thereby increasing the total throughput.

The traffic shaping process also keeps track of the throughput of transmitted data to each virtual port, so as not to exceed the port data rate (or to exceed it by only a predetermined, desirable amount for transient periods of time). In this embodiment, as will be described in more detail, a weighted round-robin algorithm is used to stop further transmissions on a port during a transmission cycle, if that port has reach its desired rate.

The traffic shaping process iterates over the schedule repeatedly. Each iteration represents a predetermined time period known as a transmission cycle. During that period, the sum of the transmission opportunities within the schedule supports at least the aggregate bandwidth (in terms of bits per second) that the traffic shaper device is capable of transmitting or controlling.

When a schedule allocates more opportunities to a virtual connection or port than are minimally necessary to ensure full service to the virtual connection or port, the virtual connection or port is "oversubscribed". One motivation for oversubscribing is to allow a virtual connection or port that was under-utilized during an early portion of the schedule iteration additional opportunities to reach its maximum rate.

Thus, through oversubscription, the sum of the transmission opportunities within the schedule can support more than the aggregate bandwidth supported by the router/traffic shaper and by the collection of virtual ports. The traffic shaping process ensures that oversubscription does not lead to transmission rates that exceed maximum port rates or virtual connection peak rates.

Port work conserving is a technique for using transmission opportunities that would otherwise be unused. When a first port is not using its transmission opportunity, such as due to port blockage or lack of enqueued data, a port work conserving process offers the transmission opportunity to one or more other ports, thereby reducing the amount of un-transmitted data and allowing more data to be transmitted sooner.

The traffic shaping process generally needs to maintain steady timing. For instance, the traffic shaping process transmits to virtual ports that correspond to physical ports. The physical ports have data rates that work on timing cycles. Also, the traffic shaping process runs on transmit processors that have timing cycles of their own. Cycle adjustment features of the schedule and the port ring enable the traffic shaping process to maintain steady timing.

Priority rankings among UBR queues enable the traffic shaping process to favor higher-priority virtual connections over other virtual connections, even when none of the virtual connections has a contracted rate.

Formulating the schedule is beyond the scope of this description. A schedule is assumed to have been furnished to the router/traffic shaper. In described embodiments, the traffic shaping process can process and enforce a supplied schedule.

Potential advantages include simplifying the scheduling problem to first schedule port rates, then schedule virtual connection rates. The port rates are based on physical ports (at some location, whether local or remote) and are therefore unchanging for a long period of time, often on the order of months. Within each port, there are fewer virtual connections than in the router/traffic shaper overall. Thus, algorithms can schedule the next cell for a virtual connection more efficiently, due to the fact there are fewer contending virtual connections. A second embodiment schedules unspecified-rate virtual connections on a per-virtual port basis, while scheduling specified-rate service (such as CBR, or VBR service with minimums) globally. This second embodiment has a similar advantage of simplifying the scheduling of unspecified-rate virtual connections, while also being advantageously space-efficient when scheduling specified-rate virtual connections.

Another advantage is that this is a software implementation in described embodiments. A router/traffic shaper device using this approach can be modified, for instance to adjust to new algorithms or standards, without changes to the hardware. However, it should be understood that other embodiments could partially or wholly store the computing instructions in hardware in a read-only medium.

Various other well-known algorithms can be applied to priority selection 74*d*, such as weighted round-robin or weighted fair queuing.

Accordingly, other embodiments are within the scope of the following claims.

What is claimed is:

1. A machine-based method for transmitting network traffic, including:
   selecting a virtual port for transmission according to a first sequence that represents time slots in a transmission cycle, each time slot associated with a virtual port, with a rate at which data is transmitted to a virtual port related to how many of the time slots from the first sequence are associated with the virtual port;
   selecting a virtual connection from a plurality of virtual connections that use the virtual port, according to a second sequence that allocates a plurality of transmission opportunities to the virtual connections within an associated time slot; and
   transmitting data to the virtual connection during an allocated one of the transmission opportunities in the plurality of transmission opportunities based at least in part on a position of an element within a data structure encoding the second sequence, the position being specified by an element of a data structure encoding the first sequence.

2. The method of claim 1, wherein the first sequence is encoded in a first array.

3. The method of claim 2, wherein the first array includes major nodes, a second array of minor nodes encodes the second sequence, and a major node in the first array specifies a minor node in the second array.

4. The method of claim 3, wherein selecting a virtual connection includes:
selecting a scheduled virtual connection specified by the minor node if the scheduled virtual connection is ready for transmission; and otherwise
selecting an unscheduled virtual connection from the plurality of virtual connections.

5. The method of claim 4, wherein selecting the unscheduled virtual connection selects corresponding to network traffic in a priority queue that has a most urgent relative priority among a plurality of priority queues.

6. The method of claim 5, wherein the priority queue is selected according to emptiness indicators corresponding to the plurality of priority queues.

7. The method of claim 1, further comprising: performing an iteration of the plurality of transmission opportunities according to the sequence, to include attempting the processes of selecting the virtual port, selecting the virtual connection, and transmitting to the virtual connection for each transmission opportunity in the plurality of transmission opportunities.

8. The method of claim 7, further comprising: repeating the iteration of the plurality of transmission opportunities according to the sequence.

9. The method of claim 8, wherein the sequence has a modification indicator, and wherein repeating the iteration includes replacing the sequence with a new sequence before repeating the iteration, when the modification indicator so indicates.

10. A machine-based method for transmitting network traffic, including:
processing a primary sequence that allocates a plurality of time slots to a plurality of virtual ports, at least some of the time slots associated with a secondary sequence that allocates a plurality of transmission opportunities within a corresponding time slot, with an element of a data structure that encodes the secondary sequence specified by an element of a data structure that encodes the primary sequence including a plurality of references to a virtual connection that has a data rate specification that includes a minimum data rate; and
satisfying the minimum data rate by transmitting to the virtual connection a corresponding minimum number of times according to a number of transmission opportunities allocated to the virtual connection according to the plurality of references.

11. The method of claim 10, wherein the primary sequence is encoded in a first array.

12. The method of claim 11, wherein the secondary sequence is encoded in a second array, and the first array includes a node specifying a position in the second array.

13. The method of claim 12, wherein the secondary sequence corresponds to a virtual port used by the virtual connection.

14. A machine-based method for transmitting network traffic, including:
processing a primary sequence that allocates one or more time slots to a secondary sequence that allocates a plurality of transmission opportunities within a corresponding time slot, with the secondary sequence representing a virtual port that has a data rate; and
satisfying the data rate by transmitting to the virtual port a corresponding number of times according to a number of time slots in the primary sequence allocated to the secondary sequence representing the virtual port by a number of elements within a data structure encoding the primary sequence that specify a data structure encoding the secondary sequence.

15. The method of claim 14, wherein the primary sequence is encoded in a first array.

16. The method of claim 15, wherein the secondary sequence is encoded in a second array, and the first array includes a node specifying a position in the second array.

17. A machine-based method for transmitting network traffic, including:
selecting a virtual connection for transmission according to a schedule sequence that allocates a first plurality of transmission opportunities to a plurality of scheduled virtual connections and a second plurality of transmission opportunities to a secondary sequence, where the secondary sequence allocates the second plurality of transmission opportunities to a plurality of virtual ports; and
transmitting data to the virtual connection based at least in part on a position of an element within a data structure encoding the secondary sequence, the position being specified by an element of a data structure encoding the schedule sequence.

18. The method of claim 17, wherein selecting includes a stepping process that processes a node in the schedule sequence, where the node specifies a scheduled virtual connection in the plurality of scheduled virtual connections and specifies a secondary node in the secondary sequence, where the secondary node specifies a virtual port in the plurality of virtual ports.

19. The method of claim 18, wherein the stepping process includes, if the scheduled virtual connection is ready for transmission, selecting the scheduled virtual connection to be the selected virtual connection, and otherwise
selecting a port virtual connection to be the selected virtual connection, where the port virtual connection uses an available virtual port.

20. The method of claim 19, wherein the scheduled virtual connection is a must-send virtual connection.

21. The method of claim 20, wherein the node also specifies a could-send virtual connection, and selecting the scheduled virtual connection to be the selected virtual connection includes selecting the must-send virtual connection in preference to the could-send virtual connection if the must-send virtual connection is ready for transmission.

22. The method of claim 19, wherein selecting the port virtual connection to be the selected virtual connection includes a port stepping process that, if the virtual port is not ready for transmission, steps through the secondary sequence to find a first available virtual port subsequent to the virtual port to use as the available virtual port.

23. The method of claim 19, wherein selecting the port virtual connection selects an unscheduled virtual connection from a plurality of unscheduled virtual connections that use the available virtual port.

24. The method of claim 23, wherein the unscheduled virtual connection corresponds to network traffic in a priority queue that has a most urgent relative priority among a plurality of priority queues that use the available virtual port.

25. The method of claim 24, wherein selecting the port virtual connection includes preferring a virtual connection associated with data from a new-data queue over the unscheduled virtual connection.

26. The method of claim 25, wherein selecting the port virtual connection includes preferring a virtual connection associated with data from a first-chance queue over the virtual connection associated with data from the new-data queue.

27. The method of claim 25, wherein selecting the port virtual connection includes preferring a virtual connection associated with data from a first-chance queue over the unscheduled virtual connection.

28. The method of claim 18, wherein the stepping process includes placing new network traffic on an associated new data queue for an associated virtual port if the new network traffic arrives for the scheduled virtual connection at a time when the scheduled virtual connection does not have network traffic, where the scheduled virtual connection uses the associated virtual port.

29. The method of claim 28, when an emptiness indicator indicates that the scheduled virtual connection does not have existing network traffic.

30. The method of claim 29, wherein the emptiness indicator is a bit in a bit vector.

31. The method of claim 18, wherein the stepping process includes placing network traffic on an associated first-chance queue for an associated virtual port if the scheduled virtual connection has network traffic for transmission but the associated virtual port is not ready for transmission, where the scheduled virtual connection uses the associated virtual port.

32. The method of claim 17, wherein the schedule sequence is encoded in a first array.

33. The method of claim 32, wherein the secondary sequence is encoded in a second array, and the first array includes a first node specifying a second node in the second array.

34. The method of claim 33, wherein the second node specifies an entry in a table of virtual ports.

35. An article comprising a machine-readable storage medium that stores executable instructions to transmit network traffic, the instructions causing a machine to:
select a virtual port for transmission according to a first sequence that represents time slots in a transmission cycle, each time slot associated with a virtual port, with a rate at which data is transmitted to a virtual port related to how many of the time slots from the first sequence are associated with the virtual port;
select a virtual connection from a plurality of virtual connections that use the virtual port, according to a second sequence that allocates a plurality of transmission opportunities to the virtual connections within an associated time slot; and
transmit data to the virtual connection during an allocated one of the transmission opportunities in the plurality of transmission opportunities based at least in part on a position of an element within a data structure encoding the second sequence, the position being specified by an element of a data structure encoding the first sequence.

36. The article of claim 35, wherein the first sequence is encoded in a first array.

37. The article of claim 36, wherein the first array includes major nodes, a second array of minor nodes encodes the second sequence, and a major node in the first array specifies a minor node in the second array.

38. The article of claim 37, wherein the instructions causing the machine to select the virtual connection include instructions causing the machine to:
select a scheduled virtual connection specified by the minor node if the scheduled virtual connection is ready for transmission, and otherwise
select an unscheduled virtual connection from the plurality of virtual connections.

39. The article of claim 38, wherein the selection of the unscheduled virtual connection selects corresponding to network traffic in a priority queue that has a most urgent relative priority among a plurality of priority queues.

40. The article of claim 39, wherein the priority queue is selected according to a vector of emptiness indicators corresponding to the plurality of priority queues.

41. The article of claim 35, further comprising instructions causing the machine to: perform an iteration of the plurality of transmission opportunities according to the sequence, to include attempting the processes of selecting the virtual port, selecting the virtual connection, and transmitting to the virtual connection for each transmission opportunity in the plurality of transmission opportunities.

42. The article of claim 41, further comprising instructions causing the machine to: repeat the iteration of the plurality of transmission opportunities according to the sequence.

43. The article of claim 42, wherein the sequence has a modification indicator, and wherein repeating the iteration includes replacing the sequence with a new sequence before repeating the iteration, when the modification indicator so indicates.

44. An article comprising a machine-readable storage medium that stores executable instructions to transmit network traffic, the instructions causing a machine to:
process a primary sequence that allocates a plurality of time slots to a plurality of virtual ports, at least some of the time slots associated with a secondary sequence that allocates a plurality of transmission opportunities within a corresponding time slot, with an element of a data structure that encodes the secondary sequence specified by an element of a data structure that encodes the primary sequence including a plurality of references to a virtual connection that has a data rate specification that includes a minimum data rate; and
satisfy the minimum data rate by transmitting to the virtual connection a corresponding minimum number of times according to a number of transmission opportunities allocated to the virtual connection according to the plurality of references.

45. The article of claim 44, wherein the primary sequence is encoded in a first array.

46. The article of claim 45, wherein the secondary sequence is encoded in a second array, and the first array includes a node specifying a position in the second array.

47. The article of claim 46, wherein the secondary sequence corresponds to a virtual port used by the virtual connection.

48. An article comprising a machine-readable storage medium that stores executable instructions to transmit network traffic, the instructions causing a machine to:
process a primary sequence that allocates one or more time slots to a secondary sequence that allocates a plurality of transmission opportunities within a corresponding time slot, with the secondary sequence representing a virtual port that has a data rate; and
satisfy the data rate by transmitting to the virtual port a corresponding number of times according to a number of time slots in the primary sequence allocated to the secondary sequence representing the virtual port by a number of elements within a data structure encoding the primary sequence that specify a data structure encoding the secondary sequence.

49. The article of claim 48, wherein the primary sequence is encoded in a first array.

50. The article of claim 49, wherein the secondary sequence is encoded in a second array, and the first array includes a node specifying a position in the second array.

51. An article comprising a machine-readable storage medium that stores executable instructions to transmit network traffic, the instructions causing a machine to:
select a virtual connection for transmission according to a schedule sequence that allocates a first plurality of transmission opportunities to a plurality of scheduled virtual connections and a second plurality of transmission opportunities to a secondary sequence, where the secondary sequence allocates the second plurality of transmission opportunities to a plurality of virtual ports; and
transmit data to the virtual connection based at least in part on a position of an element within a data structure encoding the secondary sequence, the position being specified by an element of a data structure encoding the schedule sequence.

52. The article of claim 51, wherein the instructions causing the machine to select the virtual connection include a stepping process that processes a node in the schedule sequence, where the node specifies a scheduled virtual connection in the plurality of scheduled virtual connections and specifies a secondary node in the secondary sequence, where the secondary node specifies a virtual port in the plurality of virtual ports.

53. The article of claim 52, wherein the stepping process includes if the scheduled virtual connection is ready for transmission, selecting the scheduled virtual connection to be the selected virtual connection, and otherwise selecting a port virtual connection that uses an available virtual port.

54. The article of claim 53, wherein the scheduled virtual connection is a must-send virtual connection.

55. The article of claim 54, wherein the node also specifies a could-send virtual connection, and selecting the scheduled virtual connection to be the selected virtual connection includes selecting the must-send virtual connection in preference to the could-send virtual connection if the must-send virtual connection is ready for transmission.

56. The article of claim 53, wherein selecting the port virtual connection to be the selected virtual connection includes a port stepping process that, if the virtual port is not ready for transmission, steps through the secondary sequence to find a first available virtual port subsequent to the virtual port to use as the available virtual port.

57. The article of claim 53, wherein selecting the port virtual connection selects an unscheduled virtual connection from a plurality of unscheduled virtual connections that use the available virtual port.

58. The article of claim 57, wherein the unscheduled virtual connection corresponds to network traffic in a priority queue that has a most urgent relative priority among a plurality of priority queues that use the available virtual port.

59. The article of claim 58, wherein selecting the port virtual connection includes preferring a virtual connection associated with data from a new-data queue over the unscheduled virtual connection.

60. The article of claim 59, wherein selecting the port virtual connection includes preferring a virtual connection associated with data from a first-chance queue over the virtual connection associated with data from the new-data queue.

61. The article of claim 59, wherein selecting the port virtual connection includes preferring a virtual connection associated with data from a first-chance queue over the unscheduled virtual connection.

62. The article of claim 52, wherein the stepping process includes placing new network traffic on an associated new data queue for an associated virtual port if the new network traffic arrives for the scheduled virtual connection at a time when the scheduled virtual connection does not have network traffic, where the scheduled virtual connection uses the associated virtual port.

63. The article of claim 52, when an emptiness indicator indicates that the scheduled virtual connection does not have existing network traffic.

64. The article of claim 63, wherein the emptiness indicator is a bit in a bit vector.

65. The article of claim 52, wherein the stepping process includes placing network traffic on an associated first-chance queue for an associated virtual port if the scheduled virtual connection has network traffic for transmission but the associated virtual port is not ready for transmission, where the scheduled virtual connection uses the associated virtual port.

66. The article of claim 51, wherein the schedule sequence is encoded in a first array.

67. The article of claim 66, wherein the secondary sequence is encoded in a second array, and the first array includes a first node specifying a second node in the second array.

68. The article of claim 67, wherein the second node specifies an entry in a table of virtual ports.

* * * * *